(12) United States Patent
Nakata et al.

(10) Patent No.: US 8,437,942 B2
(45) Date of Patent: May 7, 2013

(54) FUEL INJECTION CHARACTERISTIC SENSING DEVICE AND FUEL INJECTION COMMAND CORRECTING DEVICE

(75) Inventors: Kenichiro Nakata, Kariya (JP); Koji Ishizuka, Chita-gun (JP); Ru Long Li, Chiryu (JP)

(73) Assignee: Denso Corporation, Kariya (JP)

( * ) Notice: Subject to any disclaimer, the term of this patent is extended or adjusted under 35 U.S.C. 154(b) by 1287 days.

(21) Appl. No.: 12/197,447

(22) Filed: Aug. 25, 2008

(65) Prior Publication Data
US 2009/0063013 A1    Mar. 5, 2009

(30) Foreign Application Priority Data
Aug. 31, 2007  (JP) ................. 2007-227114

(51) Int. Cl.
F02D 41/30 (2006.01)
F02D 41/04 (2006.01)
F02M 47/02 (2006.01)

(52) U.S. Cl.
USPC ....................................... 701/103; 73/114.43

(58) Field of Classification Search .................. 701/102, 701/103, 104, 105; 123/494; 73/114.43
See application file for complete search history.

(56) References Cited

U.S. PATENT DOCUMENTS

| 5,485,822 | A |  | 1/1996 | Hirose et al. |
| 5,697,338 | A |  | 12/1997 | Hirose et al. |
| 5,848,581 | A |  | 12/1998 | Hirose et al. |
| 5,941,210 | A | * | 8/1999 | Hill et al. ...................... 123/305 |
| 6,142,121 | A | * | 11/2000 | Nishimura et al. ........... 123/456 |
| 7,747,377 | B2 | * | 6/2010 | Nakata et al. ................. 701/103 |
| 7,810,472 | B2 | * | 10/2010 | Kondo et al. .................. 123/456 |
| 7,865,293 | B2 | * | 1/2011 | Ishizuka et al. ............... 701/104 |

FOREIGN PATENT DOCUMENTS

| JP | 6-280717 | 10/1994 |
| JP | 2000-265892 | 9/2000 |
| JP | 2001-082298 | 3/2001 |
| JP | 2004-27939 | 1/2004 |
| JP | 2004-270531 | 9/2004 |

OTHER PUBLICATIONS

U.S. Appl. No. 11/930,668, Koji Ishizuka et al., filed Oct. 31, 2007.
U.S. Appl. No. 12/179,235, Koji Ishizuka et al., filed Jul. 24, 2008.
U.S. Appl. No. 12/186,038, Kenichiro Nakata et al., filed Aug. 5, 2008.

(Continued)

*Primary Examiner* — Stephen K Cronin
*Assistant Examiner* — Arnold Castro
(74) *Attorney, Agent, or Firm* — Nixon & Vanderhye PC

(57) ABSTRACT

A fuel injection characteristic sensing device obtains an injection characteristic of a target injector (an injector of each cylinder of a multi-cylinder engine) at each time. The device has a program for sequentially sensing fuel pressure at a sensing point corresponding to a fuel pressure sensor, which is provided at a fuel inlet of each injector, based on an output of the fuel pressure sensor. The device has a program for detecting predetermined timings (injection timings such as an injection start timing and an injection end timing) in a series of operations concerning fuel injection of the injector of each cylinder based on the sequentially sensed fuel pressure. Thus, the injection characteristic at each time including a temporal characteristic change can be obtained.

21 Claims, 10 Drawing Sheets

OTHER PUBLICATIONS

U.S. Appl. No. 12/187,638, Kenichiro Nakata et al., filed Aug. 7, 2008.
U.S. Appl. No. 12/189,376, Kenichiro Nakata et al., filed Aug. 11, 2008.
U.S. Appl. No. 12/194,917, Kenichiro Nakata et al., filed Aug. 20, 2008.
U.S. Appl. No. 12/194,130, Kenichiro Nakata et al., filed Aug. 19, 2008.
Japanese Office Action dated Jul. 10, 2009, issued in corresponding Japanese Application No. 2007-227114, with English translation.
Japanese Office Action dated Apr. 17, 2009, issued in corresponding Japanese Application No. 2007-227114, with English translation.
U.S. Appl. No. 12/195,609, Kenichiro Nakata et al., filed Aug. 21, 2008.
U.S. Appl. No. 12/201,426, Kenichiro Nakata et al., filed Aug. 29, 2008.
U.S. Appl. No. 12/210,440, Kenichiro Nakata et al., filed Sep. 15, 2008.
U.S. Appl. No. 12/210,409, Koji Ishizuka et al., filed Sep. 15, 2008.
U.S. Appl. No. 12/233,800, Kenichiro Nakata et al., filed Sep. 19, 2008.
U.S. Appl. No. 12/235,917, Kenichiro Nakata et al., filed Sep. 23, 2008.
U.S. Appl. No. 12/236,882, Koji Ishizuka et al., filed Sep. 24, 2008.
U.S. Appl. No. 12/255,936, Koji Ishizuka et al., filed Oct. 22, 2008.
U.S. Appl. No. 12/256,100, Koji Ishizuka et al., filed Oct. 22, 2008.
U.S. Appl. No. 12/258,726, Koji Ishizuka et al., filed Oct. 27, 2008.
U.S. Appl. No. 12/258,750, Koji Ishizuka et al., filed Oct. 27, 2008.

* cited by examiner

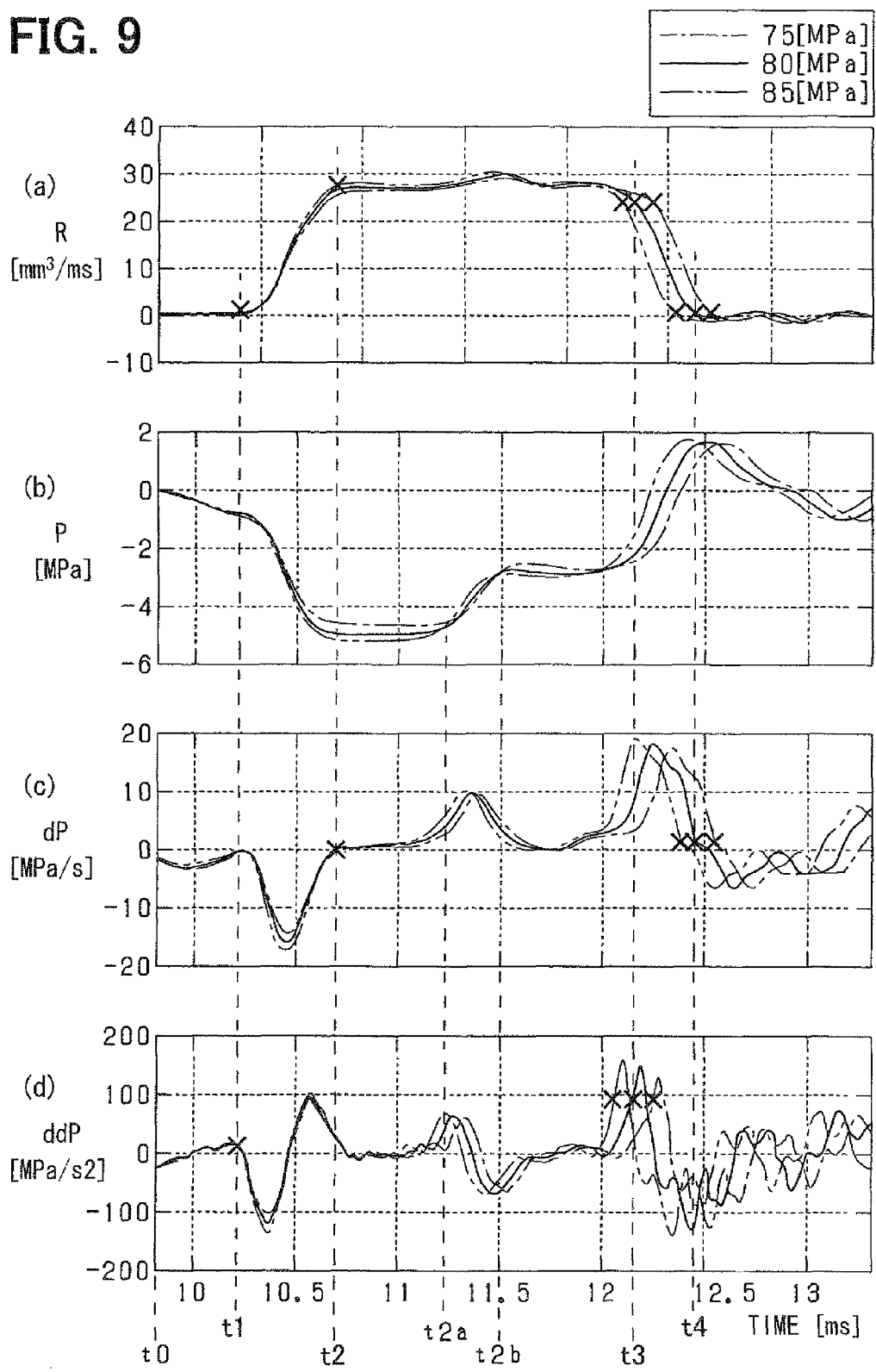

|  | P (BASE PRESSURE) |
|---|---|
|  | (LOW) ⟶ (HIGH) |
| Tc | (LONG) ⟶ (SHORT) |

|  | INJECTION PERIOD (TQ) |
|---|---|
|  | (SHORT) ⟶ (LONG) |
| Tc | (SHORT) ⟶ (LONG) |

FIG. 16

| | INJECTION MECHANISM | PRESSURE BEHAVIOR | DETECTION METHOD |
|---|---|---|---|
| (a) INJECTION START (t1) | Cd PRESSURE DOWN → INJECTION START → NOZZLE PRESSURE DOWN | PRESSURE DECREASE SPEED (dP): SMALL→LARGE | ddP |
| (b) Rmax REACH (t2) | NOZZLE PRESSURE DOWN → NOZZLE PRESSURE STEADY | STEADY PRESSURE TRANSITION (i.e., dP=0) | dP |
| (c) R DECREASE (t3) | NOZZLE PRESSURE STEADY → NOZZLE PRESSURE UP | PRESSURE INCREASE SPEED (dP): NEAR 0→LARGE | t4 |
| (d) INJECTION END (t4) | NOZZLE PRESSURE UP → NOZZLE PRESSURE PEAK → (NOZZLE PRESSURE DOWN) | PRESSURE INCREASE SPEED (dP) CROSSES ZERO | dP |

FUEL INJECTION CHARACTERISTIC SENSING DEVICE AND FUEL INJECTION COMMAND CORRECTING DEVICE

CROSS REFERENCE TO RELATED APPLICATION

This application is based on and incorporates herein by reference Japanese Patent Application No. 2007-227114 filed on Aug. 31, 2007.

BACKGROUND OF THE INVENTION

1. Field of the Invention

The present invention relates to a fuel injection characteristic sensing device that senses a fuel injection characteristic at the time of performing injection supply of fuel to a target engine and to a fuel injection command correcting device that corrects an injection command to an injector based on the fuel injection characteristic sensing device.

2. Description of Related Art

As one of technologies for improving emission of an in-vehicle diesel engine or the like, there is a known technology (high-pressure injection) for injecting and supplying fuel, which is pressurized to high pressure, directly into a cylinder through an injector. In recent years, a common rail fuel injection system (for example, a system described in Patent document 1: JP-A-H10-220272) has come to attract attention as a fuel injection system realizing the high-pressure injection. In the system, the fuel pumped from a fuel pump is accumulated in a common rail in a high-pressure state, and the accumulated high-pressure fuel is supplied to the injectors of respective cylinders through pipes (high-pressure fuel passages) provided to the respective cylinders. In the system, a predetermined pressure sensor (a rail pressure sensor) is provided to the common rail. The system is configured to control drive of various devices constituting a fuel supply system based on an output (a sensor output) of the rail pressure sensor.

Conventionally, in the case where an injection operation of the injector is controlled with such the common rail fuel injection system, a control method of setting an injection pattern in accordance with an engine operation state of each time with reference to a map (an adaptation map), in which an injection pattern (i.e., an adaptation value) for each engine operation state is written, or a mathematical expression is widely adopted. The device stores the optimum pattern (i.e., the adaptation value), which is beforehand obtained for each anticipated engine operation state through experiment and the like, as the map, the mathematical expression or the like (in ROM, for example). Thus, the device sets the injection pattern corresponding to the engine operation state with reference to the map, the mathematical expression or the like.

Thus, fuel supply to the engine can be performed in an injection mode (i.e., the injection pattern) suitable for the engine operation state of each time by using the map, in which the adaptation values are written, or the mathematical expression. However, when mass production and mass marketing of respective components of the engine control system are performed, usually, there occur certain individual differences in characteristics of various kinds of control components including the injector, for example, between the engines and also between the cylinders in the case of a multi-cylinder engine. In such the case, it takes a lot of works and is not realistic for the present production system to obtain the adaptation values (the optimum injection patterns) for all the components (for example, all the cylinders manufactured through the mass production and mounted in the vehicle) in consideration of also the individual differences. Therefore, it is difficult to perform the control in consideration of all the influences due to the individual differences even when the map, in which the adaptation values are written, or the mathematical expression is used.

In order to perform the injection control with high accuracy, a characteristic change resulting from aging of the control components and the like is not negligible. Even if the conventional device such as the device described in Patent document 1 can obtain the optimum value with high accuracy in an initial stage, an influence of the subsequent characteristic change is unknowable. Therefore, there is a concern that there occurs a deviation from the optimum value with passage of time. In this case, an adaptation value of a degradation factor (a coefficient concerning a degree of degradation with time) may be beforehand obtained with an experimental value and the like and may be stored as a map, a mathematical expression or the like. However, there is also the above-mentioned individual difference in the temporal characteristic change of every component. Therefore, it is difficult to thoroughly remove the influence.

SUMMARY OF THE INVENTION

It is an object of the present invention to provide a fuel injection characteristic sensing device and a fuel injection command correcting device capable of obtaining an injection characteristic of each time including a temporal characteristic change.

According to an aspect of the present invention, a fuel injection characteristic sensing device is used in a fuel injection system having a pressure accumulator that accumulates fuel to be supplied to a predetermined injector under pressure and at least one fuel pressure sensor for sensing pressure of the fuel flowing through an inside of a fuel passage extending from the pressure accumulator to a fuel injection hole of the injector at a predetermined point downstream of a neighborhood of a fuel discharge hole of the pressure accumulator with respect to a fuel flow direction. The fuel injection characteristic sensing device includes a fuel pressure sensing section and an injection timing detecting section. The fuel pressure sensing section sequentially senses the fuel pressure at the predetermined point corresponding to the fuel pressure sensor based on at least one output of the at least one fuel pressure sensor. The injection timing detecting section detects a predetermined timing (an injection timing) in a series of operations concerning fuel injection of the injector based on the fuel pressure sequentially sensed by the fuel pressure sensing section.

In this way, the above-described fuel pressure sensor is installed to measure pressure at the predetermined point downstream of the neighborhood of the fuel discharge hole of the pressure accumulator (for example, a common rail) with respect to the fuel flow direction in the fuel passage extending from the pressure accumulator to the fuel injection hole of the injector. Thus, a pressure fluctuation mode due to at least one of the injection operation (for example, opening/closing action of an electromagnetic valve in the case of an injector of a type that drives a needle based on opening/closing of the electromagnetic valve) and the actual injection (injection actually performed through the injection operation) of the injector concerning a predetermined injection can be accurately sensed at the installation point of the sensor.

The device in Patent document 1 described above fundamentally controls the injection pressure of the injector only with the rail pressure sensor that senses the pressure in the common rail (i.e., the rail pressure) as the pressure accumulator. In this device, the pressure fluctuation due to the injection (including the injection operation) attenuates when or before the fluctuation reaches from the fuel injection hole of the injector to the common rail and does not appear as a fluctuation of the rail pressure. Therefore, with such the device, it is difficult to sense the pressure fluctuation caused by the above-described injection with high accuracy.

As contrasted thereto, the device according to the above aspect of the present invention has the fuel pressure sensor that senses the injection pressure at the position closer to the fuel injection hole than the rail pressure sensor (or a sensor provided near the common rail) is. Therefore, the pressure fluctuation due to the injection (including the injection operation) can be grasped appropriately with the pressure sensor before the pressure fluctuation attenuates. Therefore, with such the device, predetermined timings in a series of operations concerning the fuel injection of the injector such as an injection start timing, a maximum injection rate reaching timing, a timing at which the injection rate starts decreasing after reaching the maximum injection rate and an injection end timing of the injector can be detected with high accuracy based on the fuel pressure sequentially sensed by the fuel pressure sensing section.

Moreover, in some cases, the fuel injection characteristic sensing device constituting the common rail type fuel injection system is provided with a fuel pulsation reducing section in a connection between the common rail and a fuel discharge pipe of the common rail for reducing a fuel pulsation transmitted to the common rail through the fuel discharge pipe in order to reduce the pressure pulsation in the common rail and to supply the fuel to the injector at stable pressure. In such the cases the pressure fluctuation due to the injection (including the injection operation) arises in the fuel injection hole of the injector and spreads toward the common rail through the common rail fuel discharge pipe. The fuel pulsation out of the pressure fluctuation is reduced (attenuated) by the fuel pulsation reducing section. Therefore, with such the construction, it is difficult to correctly sense the pressure fluctuation mode due to the injection (including the injection operation) based on the pressure in the common rail (i.e., the rail pressure).

In this regard, according to another aspect of the present invention, the fuel injection characteristic sensing device is applied to a fuel injection system that has a fuel pulsation reducing section and at least one fuel pressure sensor for sensing pressure of the fuel flowing through an inside of a fuel passage extending from a pressure accumulator to a fuel injection hole of an injector at a predetermined point downstream of the fuel pulsation reducing section with respect to a fuel flow direction. The fuel injection characteristic sensing device includes a fuel pressure sensing section and an injection timing detecting section. The fuel pressure sensing section sequentially senses the fuel pressure at the predetermined point corresponding to the fuel pressure sensor based on at least one output of the at least one fuel pressure sensor. The injection timing detecting section detects a predetermined timing in a series of operations concerning fuel injection of the injector based on the fuel pressure sequentially sensed by the fuel pressure sensing section. With such the construction, the pressure fluctuation mode can be sensed with the fuel pressure sensor before the fuel pulsation is reduced by the fuel pulsation reducing section. Eventually, the pressure fluctuation mode can be sensed with high accuracy.

In this case, according to another aspect of the present invention, the fuel pulsation reducing section is constituted by an orifice (a restrictor), a flow damper, or a combination of the orifice and the flow damper. With such the construction, the above object can be attained suitably. Moreover since the technology for reducing the fuel pulsation with the use of the orifice or the flow damper has been already put in practical use and has actual achievements, thereby possessing high practicality and reliability.

According to another aspect of the present invention, at least one of the fuel pressure sensors is provided inside or near the injector.

The pressure fluctuation mode due to the injection (including the injection operation) can be sensed through the sensor output of the fuel pressure sensor with higher accuracy as the installation position of the fuel pressure sensor is closer to the fuel injection hole of the injector. Therefore, in order to sense the pressure fluctuation mode with high accuracy, it is effective to install the fuel pressure sensor inside or near the injector as in the construction according to the above aspect. In this case, if at least one of the fuel pressure sensors is provided to a fuel inlet of the injector, mountability and maintenance performance of the fuel pressure sensor are improved and the pressure can be sensed with high accuracy in a comparatively stable manner.

According to another aspect of the present invention, at least one of the fuel pressure sensors is provided in a fuel discharge pipe of the pressure accumulator at a position closer to the fuel injection hole of the injector than the pressure accumulator. In the device according to the above aspects, it is important to locate at least one of such the sensors at a position, which is provided closer to the injector than the pressure accumulator to the extent that the pressure fluctuation caused in the injector does not attenuate completely before reaching the position. For this reason, it is desirable to locate the fuel pressure sensor at the position close to the injector.

According to another aspect of the present invention, the fuel pressure sensing section sequentially obtains a sensor output of the fuel pressure sensor at an interval short enough to plot a profile of a pressure transition waveform with the sensor output.

The pressure fluctuation mode due to the injection (including the injection operation) can be usually sensed as a pressure transition waveform. In order to sense the pressure transition waveform (i.e., the pressure fluctuation mode) appropriately with high accuracy, it is effective to sequentially acquire the sensor output of the fuel pressure sensor at an interval short enough to grasp the pressure transition waveform.

According to another aspect of the present invention, the fuel pressure sensing section sequentially obtains the sensor output of the fuel pressure sensor at an interval shorter than 50 microseconds. In the case where the device according to one of the above aspects of the present invention using the fuel pressure sensor is applied to a presently adopted general common rail system, the construction of sequentially acquiring the sensor output at the interval shorter than 50 microseconds is specifically effective to appropriately grasp the tendency of the pressure fluctuation mentioned above.

However, in order to obtain the above-described pressure fluctuation mode with higher accuracy, a construction of sequentially acquiring the sensor output at a shorter interval is more desirable. Therefore, usually, it is desirable to set the acquisition interval of the sensor output (fuel pressure signal) to as short an interval as possible, while considering disadvantages due to the increase in the acquisition time number of the sensor output or disadvantages due to increase in a computation load, for example.

Specifically important timings among the timings (injection timings) in a series of operations concerning the fuel injection of the injector are timings at which a change is caused in an actual injection state (such as an injection start, an injection operation while increasing an injection rate, an injection operation at the maximum injection rate, an injection operation while decreasing the injection rate and an injection end) or an injection operation state (such as an opened/closed state of an electromagnetic valve in the case of an injector of a type that drives a needle based on opening/closing of the electromagnetic valve). At such the timings, usually, the pressure in the fuel passage also changes with the change in the actual injection state or the injection operation state.

In order to appropriately grasp such the pressure change, according to another aspect of the present invention, the fuel injection characteristic sensing device has a differentiating section for applying first or higher order differential processing to fuel pressure data sequentially sensed by the fuel pressure sensing section to obtain differential data including at least one of a differential value at a predetermined timing, a timing indicating a predetermined differential value and a timing at which a differential value indicates a predetermined changing mode. The injection timing detecting section detects a predetermined timing in a series of operations concerning the fuel injection of the injector based on the differential data obtained by the differentiating section.

Normally, the magnitude and the timing of the pressure change appear more notably in a differential value of the pressure than in the pressure. That is, for example, the magnitude and the timing of the pressure change appear specifically notably in the differential value of the pressure at a predetermined timing, a timing indicating a predetermined differential value of the pressure, a timing at which the differential value of the pressure indicates a predetermined changing mode, or the like. Therefore, the device according to the above aspect can detect the predetermined injection timing with high accuracy.

In this case, according to another aspect of the present invention, the differentiating section obtains an inflection point of a pressure transition as the timing at which the differential value indicates the predetermined changing mode.

In many cases, the injection timing indicating the characterizing portion of the injection characteristic is indicated by an inflection point (or a point based on the inflection point) of a pressure transition in the pressure transition. Therefore, with the above-described construction, the injection characteristic (the predetermined timing concerning the fuel injection) of the injector can be detected precisely.

Among major injection timings, for example, the injection start timing, the maximum injection rate reaching timing, the timing at which the injection rate starts decreasing after reaching the maximum injection rate, the injection end timing of the injector and the like are indicated by the pressure inflection points.

Therefore, according to another aspect of the present invention, the injection timing detecting section detects one of the injection start timing, the maximum injection rate reaching timing at which the injection rate is maximized, the timing at which the injection rate starts decreasing after reaching the maximum injection rate and the injection end timing of the injector based on the pressure inflection point obtained by the differentiating section. Thus, the respective timings can be detected appropriately.

Thus, the inflection points in the pressure transition usually indicate multiple injection timings. Therefore, when detection of only a specific injection timing is required, it is effective to limit the detection period of the pressure inflection point to a predetermined period, for example.

For example, in the case of detecting the injection start timing of the injector, according to another aspect of the present invention, the differentiating section obtains the pressure inflection point in a predetermined period, whose start timing is set at an injection start command timing to the injector or at a timing based on the command timing. The injection timing detecting section detects the injection start timing of the injector based on the pressure inflection point in the predetermined period obtained by the differentiating section. Usually, the injection start timing of the injector occurs slightly after the injection start command timing. Therefore, in order to detect the injection start timing with high accuracy, it is specifically effective to detect the pressure inflection point in the above-described predetermined period as an index indicating the injection start timing.

In the case where the multiple pressure inflection points are detected or can be detected with the device according to the above aspects, according to another aspect of the present invention, the fuel injection characteristic sensing device further has a first determining section for determining whether the pressure inflection point detected by the differentiating section is a target pressure inflection point based on the detection timing of the pressure inflection point or a position of the pressure inflection point in a chronological order of the pressure inflection points in a state where multiple pressure inflection points are detected by the differentiating section or every time the pressure inflection point is detected by the differentiating section. Thus, by checking the detection timings or the detection order of the pressure inflection points, it can be suitably determined which one of the already detected multiple pressure inflection points indicates the target timing or whether the pressure inflection point detected at the time indicates the target timing.

According to another aspect of the present invention, the differentiating section obtains a cross point as a timing at which an n-th order differential value of the fuel pressure (n is an integer equal to or greater than one) shifts from a smaller side to a larger side than a predetermined threshold value or shifts from the larger side to the smaller side than the predetermined threshold value based on the n-th order differential value of the fuel pressure in a predetermined period. The injection timing detecting section detects a predetermined timing in a series of operations concerning the fuel injection of the injector based on the cross point obtained by the differentiating section.

For example, in the case of detecting the injection start timing of the injector, according to another aspect of the present invention, the differentiating section obtains the cross point as a timing at which a second order differential value of the fuel pressure shifts from a larger side to a smaller side than a predetermined threshold value based on the second order differential value of the fuel pressure in a predetermined period (set near an injection start timing anticipated empirically). The injection timing detecting section detects the injection start timing of the injector based on the cross point obtained by the differentiating section. At the injection start timing, usually, a steep decrease of the fuel pressure arises with the change in the actual injection state. In this regard, with the above construction, the pressure drop can be surely grasped with the cross point, and eventually the injection start timing can be detected with high accuracy.

In this case, in order to further improve the detection accuracy, it is effective to variably set the threshold value used when detecting the cross point. For example, according to another aspect of the present invention, the fuel injection characteristic sensing device has a first setting section for variably setting the threshold value concerning the cross point in accordance with fuel pressure immediately before the injection (i.e., a fuel pressure level in a stable period) or an equivalent value of the fuel pressure immediately before the injection (i.e., a value indicating an equivalent value of the fuel pressure immediately before the injection: an estimate of the fuel pressure level). Alternatively, according to another aspect of the present invention, the fuel injection characteristic sensing device has a second setting section for variably setting the threshold value concerning the cross point in accordance with an injection start command timing directed by an injection start command to the injector. Alternatively, according to another aspect of the present invention, the fuel injection characteristic sensing device has a third setting section for variably setting the threshold value concerning the cross point in accordance with pressure in a cylinder of a target engine (i.e., cylinder pressure).

The pressure drop accompanying the above-mentioned injection start (i.e., the change in the actual injection state) becomes steeper as the fuel pressure (i.e., the fuel pressure level) immediately before the injection increases, as the injection execution timing comes closer to TDC (a top dead center), or as the cylinder pressure increases. Therefore, it is preferable to variably set the threshold value concerning the cross point correspondingly. That is, it is preferable to set the threshold value to be smaller as the pressure drop becomes steeper (refer to FIGS. 11A to 11C). In this regard, with the above construction according to each of the above three aspects, the threshold value can be variably set in accordance with each of the above parameters. Accordingly, the pressure drop and eventually the injection start timing can be detected with high accuracy.

In addition, in the case of detecting the maximum injection rate reaching timing of the aforementioned injector, a following construction is effective. That is, according to another aspect of the present invention, the differentiating section obtains the cross point as a timing at which a first order differential value of the fuel pressure shifts from a smaller side to a larger side than a predetermined threshold value based on the first order differential value of the fuel pressure in a predetermined period. The injection timing detecting section detects the maximum injection rate reaching timing of the injector based on the cross point obtained by the differentiating section (for example, as a timing that is close to the cross point but is distant from the cross point by a predetermined distance). Usually, the steep decrease of the fuel pressure caused at the injection start ends and the fuel pressure stabilizes at the maximum injection rate reaching timing. In this regard, with the above construction, the timing when the fuel pressure stabilizes can be surely grasped with the cross point, and eventually the maximum injection rate reaching timing can be detected with high accuracy.

In the case of detecting the injection end timing of the injector, a following construction is effective. That is, according to another aspect of the present invention, the differentiating section obtains the cross point as a timing at which a first order differential value of the fuel pressure shifts from a larger side to a smaller side than a predetermined threshold value based on the first order differential value of the fuel pressure in a predetermined period. The injection timing detecting section detects the injection end timing of the injector based on the cross point obtained by the differentiating section. Usually, the steep increase of the fuel pressure caused with the closing of the injector ends and the pulsation of the fuel pressure starts at the injection end timing. In this regard, with the above construction, the change in the pressure fluctuation mode can be grasped appropriately with the cross point. Eventually, the injection end timing can be detected with high accuracy.

In the case where the injector has a fluid control valve for controlling an inflow of a fluid to a predetermined space and an outflow of the fluid from the space and a needle that performs reciprocation operation inside a valve body of the injector in accordance a change in pressure in the space accompanying the inflow and the outflow of the fluid to open and close an injection hole (a fuel injection hole) or a fuel supply passage extending to the injection hole, thereby performing valve opening and valve closing of the injector, a valve-closing timing of the fluid control valve and the like are also important to grasp an operating state of the injector.

Therefore, in this case, a following construction is effective. That is, according to another aspect of the present invention, the differentiating section obtains the cross point as a timing at which a first order differential value of the fuel pressure shifts from a smaller side to a larger side than a predetermined threshold value based on the first order differential value of the fuel pressure in a predetermined period. The injection timing detecting section detects a closing timing of the fluid control valve based on the cross point obtained by the differentiating section. Usually, at the closing timing of the fluid control valve, a steep increase of the fuel pressure arises with the change in the injection operation state. In this regard, with the above construction, the pressure increase can be surely grasped with the cross point, and eventually the valve-closing timing of the fluid control valve can be detected with high accuracy.

The above-described cross points also indicate the multiple injection timings. Therefore, in the case where the multiple cross points are detected or can be detected, a following construction is effective as in the case of the above described pressure inflection points. That is, according to another aspect of the present invention, the fuel injection characteristic sensing device further has a second determining section for determining whether the cross point detected by the differentiating section is a target cross point based on detection timing of the cross point or a position of the cross point in a chronological order of the cross points in a state where multiple cross points are detected by the differentiating section or every time the cross point is detected by the differentiating section. Thus, by checking the detection timings or the detection order of the cross points, it can be suitably determined which one of the already detected multiple cross points indicates the target timing or whether the cross point detected at the time indicates the target timing.

According to another aspect of the present invention, the differentiating section detects a start point of steep pressure increase or steep pressure decrease, in which a pressure change amount per unit time exceeds a predetermined level, as the timing at which the differential value indicates the predetermined changing mode.

Alternatively, according to another aspect of the present invention, the differentiating section detects an end point of steep pressure increase or steep pressure decrease, in which a pressure change amount per unit time exceeds a predetermined level, as the timing at which the differential value indicates the predetermined changing mode.

As mentioned above, when detecting the predetermined timings in a series of operations concerning the fuel injection of the injector, it is effective to grasp the change in the fuel pressure accompanying the change in the actual injection state or the injection operation state. In this regard, with the device according to each of the above two aspects, the change in the fuel pressure (i.e., a transition from stability to change or a transition from change to stability) can be exactly detected as the differential data.

For example, according to another aspect of the present invention, the injection timing detecting section detects either one of the injection start timing of the injector and the timing at which the injection rate starts decreasing after reaching the maximum injection rate based on the start point of the pressure increase or the pressure decrease obtained by the differentiating section. The steep decrease or increase of the fuel pressure usually arises at the injection start timing or the injection rate decrease start timing. Therefore, with the above construction, such the timings can be detected appropriately.

In the case where the injector has a fluid control valve for controlling an inflow of a fluid to a predetermined space and an outflow of the fluid from the space and a needle that performs reciprocation operation inside a valve body of the injector in accordance a change in pressure in the space accompanying the inflow and the outflow of the fluid to open and close an injection hole (a fuel injection hole) or a fuel supply passage extending to the injection hole, thereby performing valve opening and valve closing of the injector, a following construction is effective. That is, according to another aspect of the present invention, the injection timing detecting section detects either one of valve opening timing and valve closing timing of the fluid control valve. The steep decrease or increase of the fuel pressure usually arises at the valve-opening timing or the valve-closing timing of the fluid control valve. Therefore, with the above construction, such the timings can be detected appropriately.

According to another aspect of the present invention, the injection timing detecting section detects either one of the maximum injection rate reaching timing and the injection end timing of the injector based on the end point of the pressure increase or the pressure decrease obtained by the differentiating section. Usually, the steep decrease or increase of the fuel pressure ends and the pressure becomes relatively stable at the maximum injection rate reaching timing or the injection end timing. Therefore, with the above construction, such the timings can be detected appropriately.

According to another aspect of the present invention, the differentiating section applies filtering processing for cutting high frequency to the fuel pressure data sequentially sensed by the fuel pressure sensing section and then applies first or higher order differential processing to the data having undergone the filtering processing to derive the differential data. The filtering processing uses a low-pass filter or a band-pass filter, for example.

Generally, the sensor output contains a high frequency noise. Even if the differential processing is applied to the sensor output containing such the noise, it is difficult to correctly grasp the change in the fuel pressure accompanying the change in the actual injection state or the injection operation state mentioned above. In this regard, with the device according to the above aspect, by applying the first or higher order differential processing to the data having undergone the filtering processing, the change of the fuel pressure accompanying the change of the actual injection state or the injection operation state can be detected with high accuracy.

According to another aspect of the present invention, the injection timing detecting section detects a first injection timing as the predetermined timing in a series of operations concerning fuel injection of the injector based on the fuel pressure sequentially sensed by the fuel pressure sensing section. The fuel injection characteristic sensing device further has a second injection timing detecting section for detecting a second injection timing as the predetermined timing other than the first injection timing among the timings in a series of operations concerning the fuel injection of the injector based on a relative positional relationship of the second injection timing with respect to the first injection timing detected by the injection timing detecting section.

Among the injection timings, there are timings having a certain correlation (relative positional relationship) therebetween. Therefore, the timing having such the correlation can be easily detected (estimated) from the other injection timing by using the correlation even without detecting the injection timings individually.

For example, according to another aspect of the present invention, the first injection timing is the injection end timing of the injector and the second injection timing is the timing at which the injection rate starts decreasing after reaching the maximum injection rate. The second injection timing detecting section detects the second injection timing as a timing earlier than the first injection timing, which is detected by the injection timing detecting section, by a predetermined return time. Thus, the injection rate decrease start timing can be easily detected from the injection end timing. Specifically, the positional relationship between the injection end timing and the injection rate decrease start timing is constant. Therefore, it is specifically effective to apply such the detection method to the injection end timing or the injection rate decrease start timing.

In order to further improve the detection accuracy, it is effective to variably set the return time used when detecting the injection rate decrease start timing. For example, following constructions are effective. That is, according to another aspect of the present invention, the fuel injection characteristic sensing device further has a fourth setting section for variably setting the return time in accordance with fuel pressure immediately before the injection (i.e., a fuel pressure level in the stable period) or an equivalent value of the fuel pressure immediately before the injection (i.e., a value indicating an equivalent value of the fuel pressure immediately before the injection: an estimate of the fuel pressure level). Alternatively, according to another aspect of the present invention, the fuel injection characteristic sensing device further has a fifth setting section for variably setting the return time in accordance with an injection period (equivalent to pulse width of the injection command, for example).

The time since the injection rate starts to decrease until the injection ends lengthens as the fuel pressure (the fuel pressure level) immediately before the injection increases or as the injection period lengthens. Therefore, it is preferable to variably set the return time in accordance with these parameters (refer to FIGS. 15A and 15B). In this regard, with the construction according to each of the above two aspects, the return time can be variably set in accordance with each of the parameters. Accordingly, the injection rate decrease start timing can be detected with high accuracy.

According to another aspect of the present invention, the injection timing detecting section is configured to be able to detect a plurality of timings in a series of operations concerning the fuel injection of the injector singularly or with another detecting section. The fuel pressure sensing section sequentially senses the fuel pressure at respective times in a predetermined period, whose start timing is set to a timing when a predetermined one of the plurality of timings in a series of operations concerning the fuel injection of the injector is detected or to a timing based on the detection timing of the predetermined one of the plurality of timings. The injection timing detecting section detects a predetermined timing in a series of operations concerning the fuel injection of the injector based on the fuel pressure in the predetermined period.

Among the respective timings in a series of operations concerning the fuel injection of the injector, the order of major injection timings is generally decided, for example, as a following order: the injection start timing, the maximum injection rate reaching timing, the timing when the injection rate starts decreasing, and the injection end timing. Therefore, when either one of the timings is detected, it can be estimated how far a series of operations of the injector has proceeded. Accordingly, as in the device according to the above aspect, by setting the detection period based on one timing, another injection timing (for example, next timing of the detected timing) can be detected easily and appropriately by using the set detection period as an appropriate period.

According to another aspect of the present invention, a fuel injection command correcting device has a correcting section for correcting the injection command to the injector using the predetermined timing concerning the fuel injection detected by the fuel injection characteristic sensing device.

Thus, the fuel injection command correcting device is constructed with the above-described fuel injection characteristic sensing device. Accordingly, for example, in the case where an error between the injection timing detected by the above-described fuel injection characteristic sensing device and a reference timing (an appropriate value beforehand obtained by the experiment and the like) is large, the error can be compensated by correcting the injection command to the injector such that an injection result during a present combustion cycle is reflected in an injection in a subsequent combustion cycle. By continuously performing the correction of the injection command while applying such the feedback to the injection command, the fuel injection at appropriate timing can be maintained over a long period of time.

Alternatively, the injection command to the injector may be corrected in one combustion cycle. Therefore, according to another aspect of the present invention, the correcting section uses a timing of a predetermined event concerning the fuel injection detected by the fuel injection characteristic sensing device in a certain combustion cycle of a target engine to correct the injection command to the injector concerning a predetermined operation related to the fuel injection of the injector to be performed after the detected timing of the predetermined event in the same combustion cycle, thereby adjusting a timing of the predetermined operation related to the fuel injection. Thus, by adjusting the subsequent timing based on the previously sensed timing while detecting the injection timing with high simultaneity (i.e., in real time), the error at the previous timing can be compensated.

For example, according to yet another aspect of the present invention, the timing of the predetermined event concerning the fuel injection is a timing at which the injector starts the injection, and the predetermined operation related to the fuel injection is a valve closing operation of the injector. With such the construction, the valve-closing timing of the injector can be adjusted in accordance with the error in the injection start timing. For example, an energization period (pulse width) of the injector is corrected as the adjustment. Eventually, the injection quantity error resulting from the deviation in the injection start timing can be compensated to maintain the fuel injection quantity at the time to be appropriate.

The use of the above-described fuel injection characteristic sensing device is not limited to the correction of the injection command. Alternatively, for example, the device may be used for data analysis by data accumulation, failure diagnosis of the fuel injection system based on the error in the predetermined timing detected by the device, and the like. With such the failure diagnosis, failsafe processing or the like can be performed in an early stage of the failure.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

FIG. 9 is a time chart showing transitions of injection parameters according to the embodiment;

FIG. 16 is a table showing detection modes of the respective timings according to the embodiment.

DETAILED DESCRIPTION OF EXAMPLE EMBODIMENT

Hereafter, a fuel injection characteristic sensing device and a fuel injection command correcting device according to an embodiment of the present invention will be described with reference to the drawings. The devices according to the present embodiment are mounted, for example, in a common rail fuel injection system (high-pressure injection fuel supply system) for a diesel engine. That is, like the device described in Patent document 1, the devices according to the present embodiment are used for performing injection supply (direct injection supply) of high-pressure fuel (for example, light oil at injection pressure of 1000 atmospheres or higher) directly into a combustion chamber in a cylinder of a diesel engine.

First, an outline of the common rail fuel injection control system (an in-vehicle engine system) according to the present embodiment will be explained with reference to FIG. 1. It is assumed that the engine according to the present embodiment is a multi-cylinder engine (for example, an in-line four-cylinder engine) for a four-wheeled vehicle. In more detail, it is assumed that the engine according to the present embodiment is a four-stroke reciprocating diesel engine (internal combustion engine). In the engine, the cylinder as a target cylinder at the time is sequentially distinguished by a cylinder determination sensor (an electromagnetic pickup) provided to a camshaft of a suction valve or an exhaust valve. In each of the four cylinders #1-#4, a combustion cycle consisting of four strokes of an intake stroke, a compression stroke, a combustion stroke, and an exhaustion stroke is sequentially performed in an order of the cylinders #1, #3, #4, and #2 in a cycle of 720° CA, for example in more detail, while the combustion cycles are deviated from each other by 180° CA between the cylinders. The injectors 20 shown in FIG. 1 are injectors for the cylinders #1, #2, #3, and #4 from a fuel tank 10 side in this order.

Figure 1:
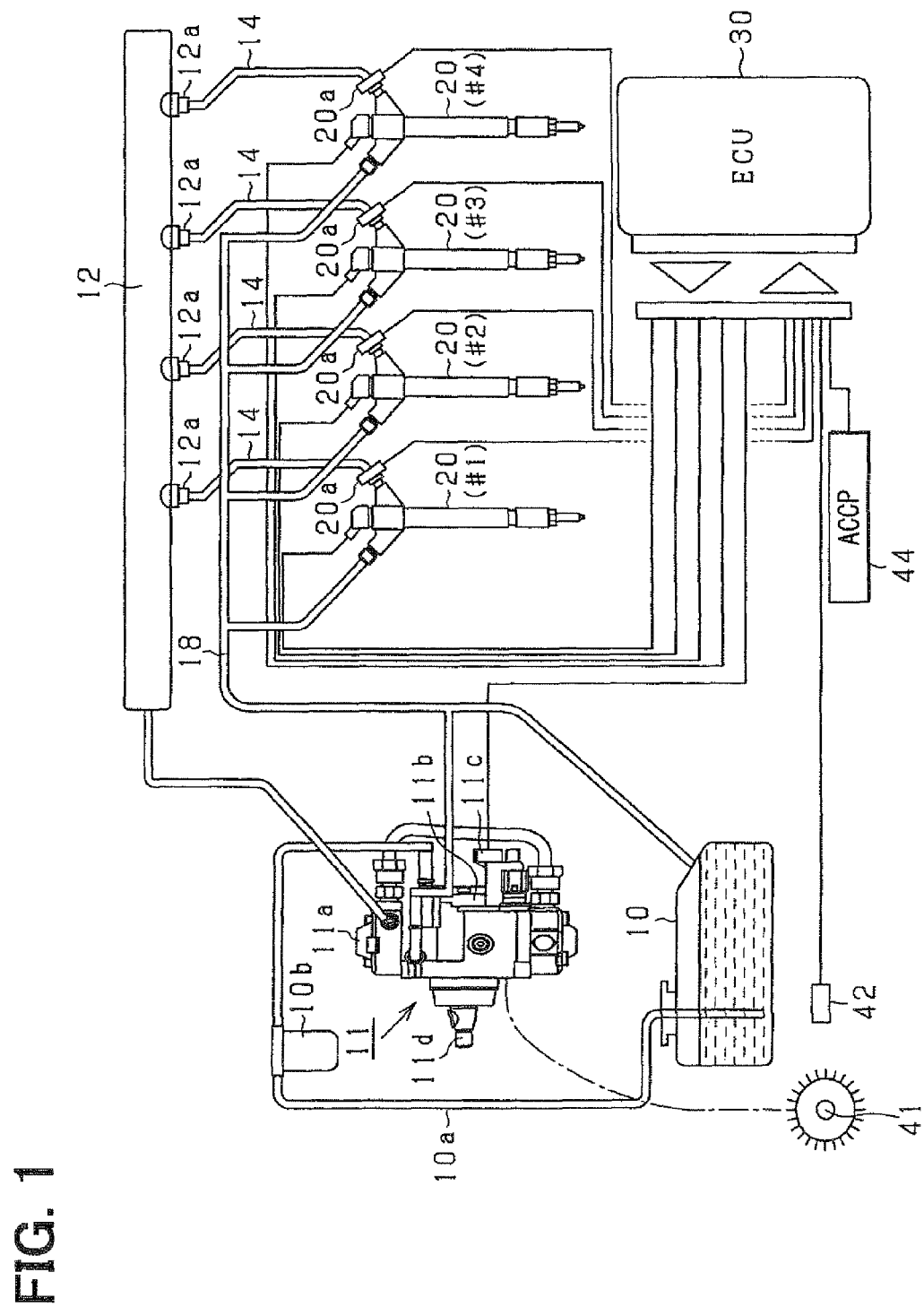
FIG. 1 is a schematic diagram showing a system including a fuel injection characteristic sensing device and a fuel injection command correcting device according to an embodiment of the present invention.

As shown in FIG. 1, generally, the system is structured such that an ECU 30 (electronic control unit) takes in sensor outputs (sensing results) from various sensors and controls drive of respective devices constituting a fuel supply system based on the respective sensor outputs. The ECU 30 adjusts a supply quantity of current to a suction control valve 11c, thereby controlling a fuel discharge quantity of a fuel pump 11 to a desired value. Thus, the ECU 30 performs feedback control (for example, PID control) for conforming fuel pressure (current fuel pressure sensed with a fuel pressure sensor 20a) in a common rail 12 (a pressure accumulator) to a target value (target fuel pressure). The ECU 30 controls a fuel injection quantity to a predetermined cylinder of the target engine and an eventual output (i.e., rotation speed or torque of an output shaft) of the target engine to desired magnitudes based on the fuel pressure.

The devices constituting the fuel supply system including the fuel tank 10, the fuel pump 11, the common rail 12 (accumulator), and the injectors 20 are connected by predetermined pipes and are located in this order from a fuel flow upstream side. Among the devices, the fuel tank 10 and the fuel pump 11 are connected by a pipe 10a via a fuel filter 10b.

In such the fuel supply system, the fuel tank 10 is a tank (a vessel) for storing the fuel (light oil) of the target engine. The fuel pump 11 consists of a high-pressure pump 11a and a low-pressure pump 11b and is structured such that fuel drawn by the low-pressure pump 11b from the fuel tank 10 is pressurized and discharged by the high-pressure pump 11a. A fuel pumping quantity sent to the high-pressure pump 11a and the eventual fuel discharge quantity of the fuel pump 11 are metered by the suction control valve 11c (SCV) provided on a fuel suction side of the fuel pump 11. The fuel pump 11 can control the fuel discharge quantity from the pump 11 to a desired value by regulating drive current (eventually, a valve opening degree) of the suction control valve 11c. For example, the suction control valve 11c is a normally-on type regulating valve that opens when de-energized.

The low-pressure pump 11b out of the two kinds of pumps constituting the fuel pump 11 is constituted as a trochoid feed pump, for example. The high-pressure pump 11a consists of a plunger pump, for example. The high-pressure pump 11a is structured to be able to sequentially pump the fuel, which is sent to pressurization chambers, at a predetermined timing by reciprocating predetermined plungers (for example, three plungers) in axial directions thereof with an eccentric cam (not illustrated) respectively. Both pumps 11a, 11b are driven by a drive shaft 11d. The drive shaft 11d is interlocked with a crankshaft 41 as an output shaft of the target engine and rotates at a ratio of 1/1, 1/2 or the like to one revolution of the crankshaft 41. That is, the low-pressure pump 11b and the high-pressure pump 11a are driven by an output of the target engine.

The fuel drawn by the fuel pump 11 from the fuel tank 10 through the fuel filter 10b is pressure-fed (pumped) to the common rail 12. The common rail 12 accumulates the fuel pumped from the fuel pump 11 in a high-pressure state. The fuel accumulated in the high-pressure state in the common rail 12 is supplied to the injectors 20 of the respective cylinders #1-#4 through pipes 14 (high-pressure fuel passages) provided to the respective cylinders. An orifice (a restricting section of the pipe 14 as a fuel pulsation reducing section) is provided in a connection section 12a between the common rail 12 and the pipe 14 (a common rail fuel discharge pipe). The orifice reduces a fuel pulsation transmitted to the common rail 12 through the pipe 14. The fuel pulsation is generated mainly in a fuel injection hole of the injector 20 during the injection. Thus, pressure pulsation in the common rail 12 can be reduced and the fuel can be supplied to each injector 20 at stable pressure. Fuel discharge holes of the injectors 20(#1)-20(#4) are connected with a pipe 18 for returning excess fuel to the fuel tank 10.

Figure 2:
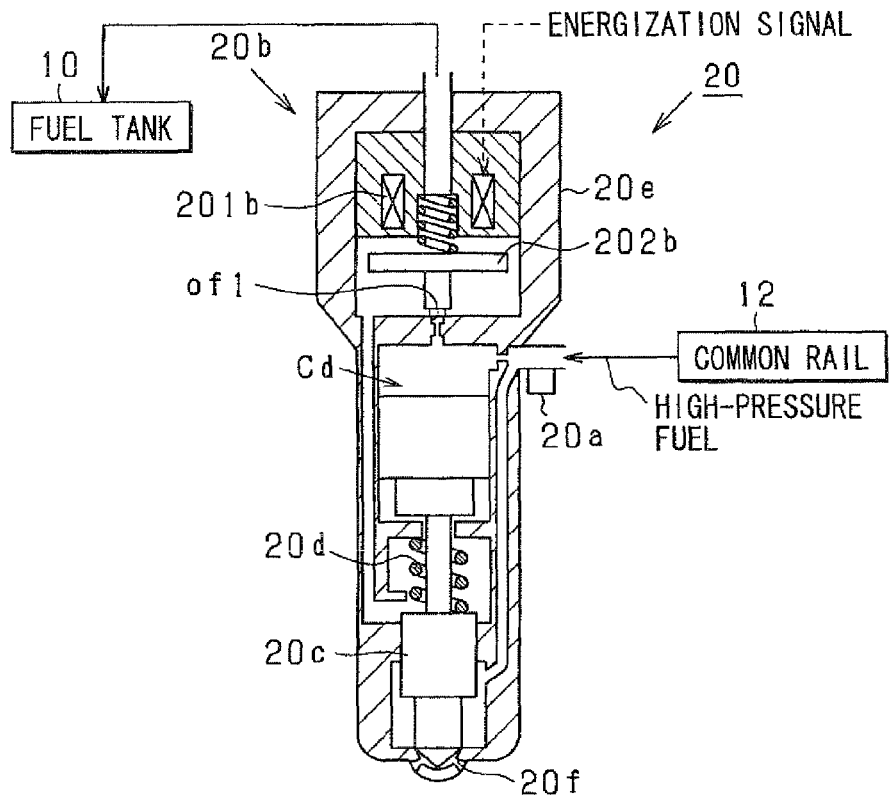
FIG. 2 is a cross-sectional diagram showing an internal structure of an injector used in the system according to the embodiment.

A detailed structure of the injector 20 is shown in FIG. 2. Basically, the four injectors 20(#1)-20(#4) have the same structure (for example, a structure shown in FIG. 2). Each injector 20 is a hydraulic drive type injector using the engine combustion fuel (i.e., the fuel in the fuel tank 10). In the injector 20, a driving power for the fuel injection is transmitted through an oil pressure chamber Cd (i.e., a command chamber).

As shown in FIG. 2, the injector 20 is a fuel injection valve of an inward-opening valve type. The injector 20 is structured as a fuel injection valve of a normally-closed type that is brought to a valve-closed state when de-energized. The high-pressure fuel is sent to the injector 20 from the common rail 12. In the present embodiment, the fuel pressure sensor 20a (also refer to FIG. 1) is provided to a fuel inlet of the injector 20. Thus, fuel pressure (inlet pressure) at the fuel inlet can be sensed at any time. In more detail, a fuel pressure fluctuation (such as a pulsation pattern) accompanying actual injection or an injection operation of the injector 20, a static fuel pressure level during a non-injection period (i.e., stable pressure) and the like can be sensed (measured) with the output of the fuel pressure sensor 20a.

When the injector 20 performs the fuel injection, an outer valve 202b (a fluid control valve) opens/closes an orifice of1 (a restrictor) in accordance with an energization state (energization/de-energization) of a solenoid 201b constituting a two-way electromagnetic valve 20b. Thus, a sealed degree of the oil pressure chamber Cd and eventually pressure in the oil pressure chamber Cd (equivalent to back pressure of a needle 20c) are increased/decreased. Due to the increase/decrease in the pressure, the needle 20c reciprocates (moves upward and downward) inside a valve cylinder (i.e., inside a housing 20e) along with or against an extensional force of a spring 20d (a coil spring). Accordingly, a fuel supply passage to injection holes 20f (necessary number of which are bored) is opened/closed in a middle thereof, or in more detail, at a tapered seat face, which the needle 20c is seated on and which the needle 20c is separated from in accordance with the reciprocating movement of the needle 20c.

Drive control of the needle 20c is performed through variable control of pulse width. A pulse signal (an energization signal) is sent from the ECU 30 to the drive section (the two-way electromagnetic valve 20b) of the needle 20c. A lift amount of the needle 20c (a separating degree from the seat face) is variably controlled based on the pulse width (equivalent to an energization period). In the control, basically, the lift amount increases as the energization period lengthens, and an injection rate (i.e., a fuel quantity injected per unit time) increases as the lift amount increases. The pressure increase processing of the oil pressure chamber Cd is performed by the fuel supply from the common rail 12. Pressure reduction processing of the oil pressure chamber Cd is performed by returning the fuel in the oil pressure chamber Cd to the fuel tank 10 through the pipe 18 (shown in FIG. 1) connecting the injector 20 and the fuel tank 10.

Thus, the injector 20 has the needle 20c that performs valve opening and valve closing of the injector 20 by opening and closing the fuel supply passage extending to the injection holes 20f through the predetermined reciprocating operation thereof inside the valve body (i.e., the housing 20e). In a non-driven state, the needle 20c is displaced in a valve-closing direction by the force (the extensional force of the spring 20d) constantly applied to the needle 20c in the valve-closing direction. In a driven state, the needle 20c is applied with a driving force, so the needle 20c is displaced in a valve-opening direction against the extensional force of the spring 20d. The lift amount of the needle 20c changes substantially symmetrically between the non-driven state and the driven state.

In the present embodiment, the fuel pressure sensors 20a are provided to the neighborhoods of the respective injectors 20(#1)-20(#4), specifically, to the fuel inlets of the respective injectors 20(#1)-20(#4). A fluctuation mode of the fuel pressure accompanying the actual injection or the injection operation of the injector 20 concerning a predetermined injection can be sensed with high accuracy based on the outputs of the fuel pressure sensors 20a (as mentioned in more detail later).

Figure 3:
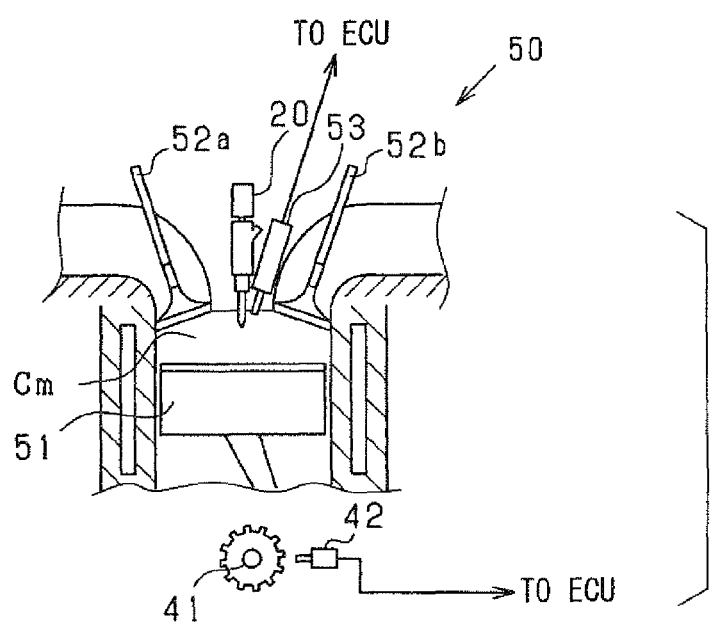
FIG. 3 is a cross-sectional side view showing an internal structure of a cylinder of a diesel engine according to the embodiment

FIG. 3 is a side view schematically showing an internal structure of one of the four cylinders #1-#4 of the diesel engine as the target of the fuel supply of the present system. The structures of the four cylinders #1-#4 are fundamentally the same. Therefore, an explanation about the internal structure of each cylinder will be given here, paying attention to one cylinder 50 (for example, the cylinder #1).

As shown in FIG. 3, the cylinder 50 accommodates a piston 51 therein. The crankshaft 41 as the output shaft that is common to the respective cylinders #1-#4 and that has a flywheel is provided to the piston 51. The crankshaft 41 rotates in conjunction with reciprocating motion of the piston 51. In the cylinder, a combustion chamber Cm is formed between a top face of the piston 51 and a cylinder head. The injector 20 is provided in the combustion chamber Cm. A cylinder pressure sensor 53 is provided in the combustion chamber Cm, for example, integrally with a glow plug (not shown) as an ignition auxiliary equipment. The cylinder pressure sensor 53 measures pressure in the cylinder 50 (i.e., cylinder pressure) with a sensing portion (tip end portion of a probe inserted into the combustion chamber Cm) located in the combustion chamber Cm and outputs a sensing signal (an electrical signal) corresponding to a measurement value. An intake port and an exhaust port are provided in a portion of the cylinder head such that the intake port connects the combustion chamber Cm with an intake pipe and such that the exhaust port connects the combustion chamber Cm with an exhaust pipe. An intake valve 52a and an exhaust valve 52b are provided to the intake port and the exhaust port respectively. In the cylinder 50, each of the intake valve 52a and the exhaust valve 52b is driven by a cam that rotates in conjunction with the crankshaft 41. The cam is attached to a camshaft that rotates once in a period in which the crankshaft 41 rotates twice. Thus, each of the intake valve 52a and the exhaust valve 52b reciprocates at a predetermined timing. Accordingly, the intake port and the exhaust port are opened and closed respectively by the valves.

Each cylinder of the target engine has such the structure. During an operation of the engine, an intake air is introduced into the combustion chamber Cm of the cylinder 50 from the intake pipe by an opening operation of the intake valve 52a. The intake air is mixed with the fuel injected and supplied directly from the injector 20 (through direct injection supply) while the intake air is compressed by the piston 51 in the cylinder 50. The mixture gas of the intake air and the fuel ignites (through self ignition) and combusts. An exhaust gas produced through the combustion is discharged to the exhaust pipe by an opening operation of the exhaust valve 52b. Thus, by causing the pistons of the cylinders to reciprocate in turn with the combustion of the fuel in the combustion chambers Cm, the crankshaft 41 as the output shaft rotates in conjunction with the reciprocation of the pistons 51.

In addition to the above-described sensors, various types of sensors for vehicle control are provided in a vehicle (not shown) such as a four-wheel passenger car or a truck. For example, a crank angle sensor 42 (for example, an electromagnetic pickup) that outputs a crank angle signal at every crank angle (for example, in the cycle of 30° CA) is provided to an outer periphery of the crankshaft 41 as the output shaft of the target engine to sense a rotational angle position of the crankshaft 41, rotation speed of the crankshaft 41 (i.e., engine rotation speed), and the like. An accelerator sensor 44 that outputs an electrical signal corresponding to a state (i.e., a displacement amount) of an accelerator is provided to the accelerator (i.e., an operation section) to sense an operation amount ACCP (i.e., a pressed amount) of the accelerator by the driver.

In such the system, it is the ECU 30 that functions as the fuel injection characteristic sensing device and the fuel injection command correcting device according to the present embodiment and that mainly performs the engine control as an electronic control unit. The ECU 30 (engine control ECU) has a well-known microcomputer (not shown). The ECU 30 grasps an operation state of the target engine and requests from the user based on the sensing signals of the above-described various types of sensors and operates the various types of actuators such as the suction control valve 11c and the injectors 20 in accordance with the engine operation state and the requests of the user. Thus, the ECU 30 performs various kinds of control concerning the engine in the optimum modes corresponding to the situation of each time.

Fundamentally, the microcomputer mounted in the ECU 30 consists of various kinds of computing units, storage devices, signal processing devices, communication devices, power supply circuits and the like such as a CPU (basic processing unit) for performing various kinds of computation, a RAM (random access memory) as a main memory for temporarily storing data in the progress of the computation, results of the computation and the like, a ROM (read-only memory) as a program memory, an EEPROM (electrically rewritable nonvolatile memory) as a memory for data storage, a backup RAM (a memory invariably supplied with power from a backup power supply such as an in-vehicle battery even after a main power supply of the ECU 30 is stopped), signal processing devices such as an A/D converter and a clock generation circuit, and input/output ports for inputting/outputting the signals from/to an exterior. Various kinds of programs, control maps and the like concerning the engine control including programs concerning the injection characteristic sensing and the injection command correction are beforehand stored in the ROM. Various kinds of control data including design data of the target engine are beforehand stored in the memory for data storage (for example, the EEPROM).

In the present embodiment, the ECU 30 calculates torque (request torque) that should be generated in the output shaft (the crankshaft 41) at the time and eventually a fuel injection quantity for satisfying the request torque based on the various kinds of the sequentially inputted sensor outputs (sensing signals). Thus, the ECU 30 variably sets the fuel injection quantity of the injector 20 to control indicated torque (generation torque) generated through the fuel combustion in each cylinder (the combustion chamber) and eventual shaft torque (output torque) actually outputted to the output shaft (the crankshaft 41) (that is, the ECU 30 conforms the shaft torque to the request torque). That is, for example, the ECU 30 calculates the fuel injection quantity corresponding to the engine operation state, the operation amount of the accelerator by the driver and the like at each time and outputs an injection control signal (a drive amount) to the injector 20 for directing the fuel injection with the calculated fuel injection quantity in synchronization with a desired fuel injection timing. Thus, i.e., based on the drive amount of the injector 20 (for example, a valve opening period), the output torque of the target engine is controlled to a target value.

Figure 4:
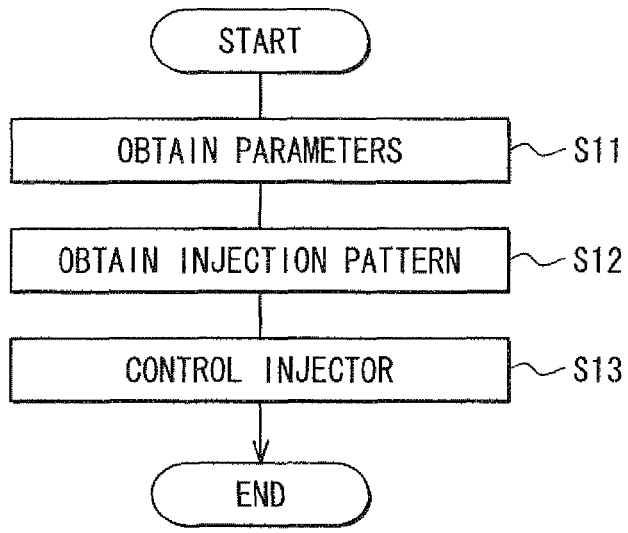
FIG. 4 is a flowchart showing a basic procedure of fuel injection control processing according to the embodiment.

As is well known, in the diesel engine, an intake throttle valve (a throttle) provided in an intake passage of the engine is held at a substantially fully-opened state during a steady operation for the purpose of increase in a fresh air quantity, reduction in a pumping loss and the like. Therefore, control of the fuel injection quantity is a main part of the combustion control during the steady operation (specifically, the combustion control concerning torque adjustment). Hereafter, a fundamental procedure of the fuel injection control according to the present embodiment will be explained with reference to FIG. 4. Values of various parameters used in the processing shown in FIG. 4 are sequentially stored in the storage device mounted in the ECU 30 such as the RAM, the EEPROM or the backup RAM and are updated at any time when necessary. Fundamentally, a series of processing shown in FIG. 4 is serially performed at a frequency of one time per combustion cycle for each cylinder of the target engine through execution of the program stored in the ROM by the ECU 30. That is, with the program, fuel supply to all the cylinders except a dormant cylinder is performed during one combustion cycle.

As shown in FIG. 4, first in S11 (S means "Step") in a series of the processing, predetermined parameters such as the engine rotation speed (i.e., an actual measurement value measured by the crank angle sensor 42) and the fuel pressure (i.e., an actual measurement value measured by the fuel pressure sensor 20*a*) at the time are read and also the accelerator operation amount ACCP (i.e., an actual measurement value measured by the accelerator sensor 44) by the driver at the time and the like are read. Then, in following S12, an injection pattern is set based on the various parameters read in S11 (and also by separately calculating the request torque including losses due to external loads and the like when necessary). With the injection pattern, in the case of the single stage injection, the injection quantity (injection period) of the injection is variably set in accordance with the torque that should be generated in the output shaft (the crankshaft 41) (i.e., request torque equivalent to the engine load at the time). In the case of the injection pattern of the multistage injection, the total injection quantity (total injection period) of the injections contributing to the torque is variably set in accordance with the request torque with the injection pattern. The command value (command signal) to the injector 20 is set based on the injection pattern. Thus, a pilot injection, a pre-injection, an after injection, a post-injection and the like are performed arbitrarily with a main injection in accordance with the situation of the vehicle and the like.

The injection pattern is obtained based on a predetermined reference map (an injection control map or a mathematical expression) and a correction coefficient stored in the ROM, for example. In more detail, the optimum injection pattern (an adaptation value) is beforehand obtained by experiments and the like in anticipated ranges of the predetermined parameters (read in S11) and is written in the map, for example. For example, the injection pattern is defined by parameters such as the number of injection stages (i.e., the time number of injections performed in one combustion cycle), an injection timing of each injection (i.e., an injection timing) and an injection period (equivalent to an injection quantity) of each injection. The above-described map indicates the relationship between the parameters and the optimum injection pattern. The injection pattern obtained based on the map is corrected with a correction coefficient (stored in the EEPROM in the ECU 30, for example) that is separately updated (in a manner explained in more detail later). For example, a set value is calculated by dividing the map value by the correction coefficient. Thus, the injection pattern of the injection to be performed at the time and eventually the injection command signal of the injector 20 corresponding to the injection pattern are obtained. When the injection pattern is set (in S12), maps set individually for the respective elements of the injection pattern (such as the number of the injection stages) may be used. Alternatively, maps, each of which is made for some collective elements of the injection pattern, or a map for all the elements of the injection pattern may be used.

The thus set injection pattern or the eventual command value (the command signal) corresponding to the injection pattern are used in following S13. That is, in S13, the drive of the injector 20 is controlled based on the command value (the command signal), or in more detail, by outputting the command signal to the injector 20. After the drive control of the injector 20, the series of the processing shown in FIG. 4 is ended.

In the present embodiment, predetermined timings (injection timings) in a series of operations concerning the fuel injection of the injector 20, or more specifically, an injection start timing, a maximum injection rate reaching timing, a timing at which the injection rate starts decreasing after reaching the maximum injection rate and an injection end timing, are sequentially detected based on the output of the fuel pressure sensor 20*a*. In addition, the correction coefficients used in S12 of FIG. 4 (more strictly, coefficients concerning the above-described timings out of multiple kinds of coefficients) are sequentially updated based on the respective detected timings.

Next, a mode of detecting the respective timings concerning the above-described fuel injection (i.e., the injection timings) based on the output of the fuel pressure sensor 20*a* will be explained in detail with reference to FIGS. 5 to 16.

Figure 5:
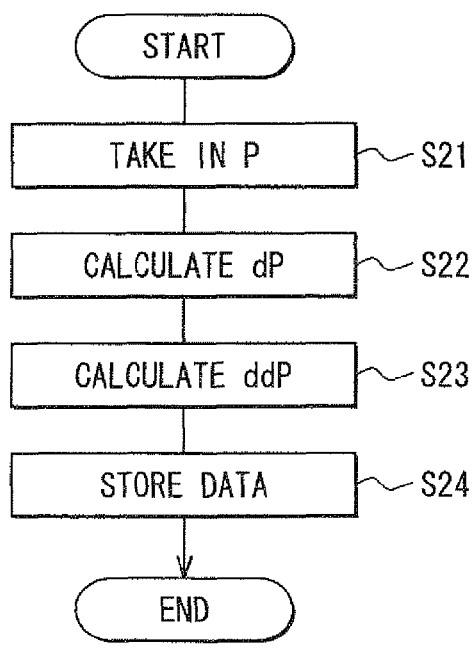
FIG. 5 is a flowchart showing a series of processing concerning data acquisition (learning processing) and differential value calculation according to the embodiment.

In the detection of the injection timings, the output of the fuel pressure sensor 20*a* is taken in first, and then, a first order differential value dP and a second order differential value ddP of the fuel pressure P at each timing are calculated from the output. FIG. 5 is a flowchart showing a series of processing concerning the data acquisition (obtainment and storage of the sensor output: learning processing) and differential value calculation. Fundamentally, a series of processing shown in FIG. 5 is serially performed at a predetermined processing interval (e.g., at an interval of 20 μsec) through execution of a program stored in the ROM by the ECU 30. Values of various parameters used in the processing shown in FIG. 5 are serially stored in the storage device mounted in the ECU 30 such as the RAM, the EEPROM or the backup RAM and are updated at any time when necessary.

As shown in FIG. 5, in a series of the processing, the output of the fuel pressure sensor 20a is taken in first in S21. In following S22, a pressure first order differential value dP is calculated as a difference between a previous value and a present value of the pressure value P (i.e., dP=P(present)−P(previous)). In following S23, a pressure second order differential value ddP is calculated as a difference between a previous value and a present value of the pressure first order differential value dP (i.e., ddP=dP(present)−dP(previous)). Then, in following S24, the respective data P, dP, ddP are stored and the series of the processing is ended.

Figure 6:
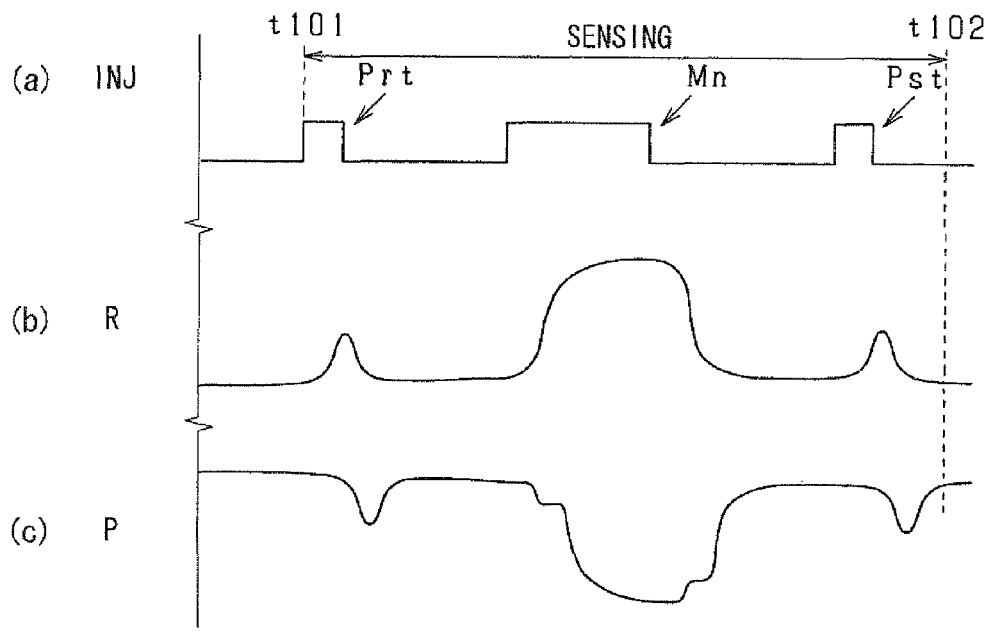
FIG. 6 is a time chart showing a setting mode of an execution period of the learning processing according to the embodiment.
Figure 7:
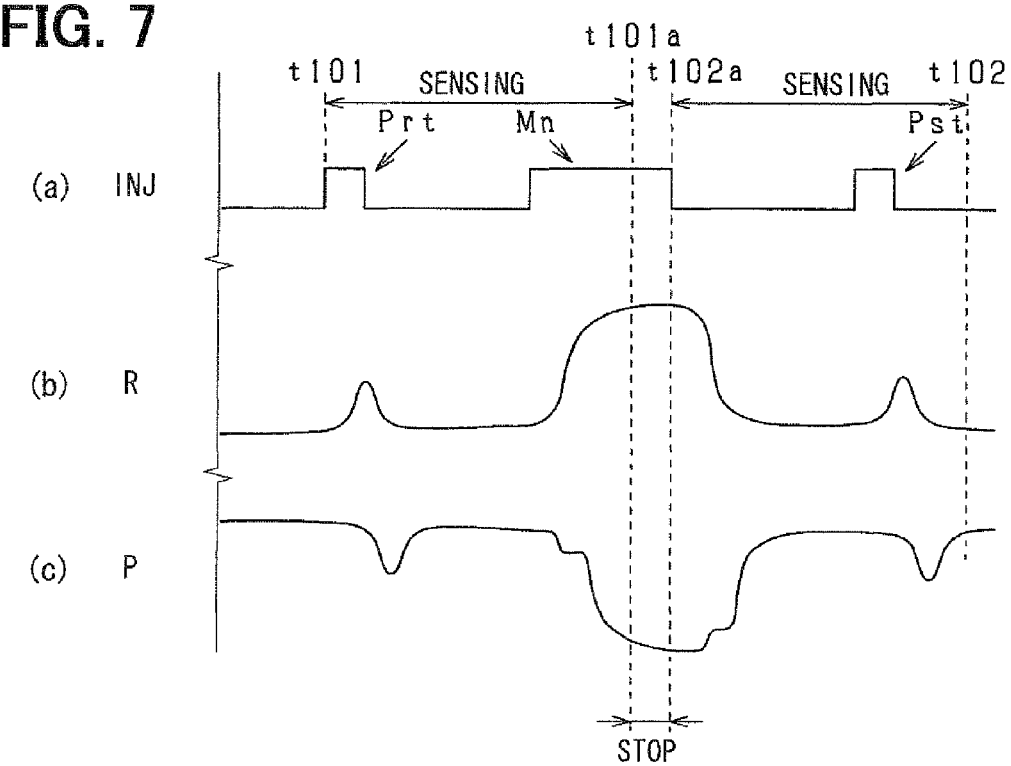
FIG. 7 is a time chart showing a setting mode of an execution period of the learning processing according to the embodiment.

Next, an execution period of the processing shown in FIG. 5 and a setting mode of the execution period will be explained with reference to FIGS. 6 and 7. In FIG. 6 or 7, part (a) is a time chart showing a transition of the injection command signal INJ (the pulse signal) to the injector 20, part (b) is a time chart showing a transition of the injection rate R (i.e., the fuel quantity injected per unit time), and part (c) is a time chart showing a transition of the fuel pressure P (i.e., the inlet pressure) sensed with the above-described fuel pressure sensor 20a (shown in FIG. 1).

As shown in FIG. 6, in the present embodiment, multiple injections (for example, three-stage injections of a pilot injection Prt, a main injection Mn and a post-injection Pst shown in FIG. 6) are performed by the injector 20 during a combustion cycle of the engine in some cases. When a sensor output acquisition period is set, a start timing of the sensor output acquisition period (i.e., a sensing period: a period indicated by "SENSING" in FIG. 6) is set to an injection start command timing (timing t101) of the injector 20, which is directed by an injection start command concerning the earliest injection in the combustion cycle (for example, the pilot injection Prt shown in FIG. 6). The energization is started at the injection start command timing t101 of the injector 20. Furthermore, an end timing (timing t102) of the above-described sensing period is set based on a pressure fluctuation mode after execution of the latest injection in the same combustion cycle (for example, the post-injection Pst shown in FIG. 6). In more detail, the end timing (timing t102) of the sensing period is set to a timing (equivalent to an injection end timing) when the pressure fluctuation caused by the post-injection Pst converges. Thus, the above-described sensing period is set at least to the period from the start of the pressure fluctuation due to the pilot injection Prt to the end of the pressure fluctuation due to the post-injection Pst in a limited way. That is, the sensing period is set to a predetermined period (from the timing t101 to the timing t102) including a period (a pressure fluctuation period), in which the pressure fluctuation is caused by the actual injection of the injector 20, in a limited way.

Fundamentally, desired data (a waveform of the pressure fluctuation related to the injection) can be obtained even during such the limited period. It is because the period excluded by the limitation of the sensing period is a period that is not a sensing target, i.e., a period in which only unnecessary data can be obtained (sensed) normally. Since the sensing period is set as the short and limited period, a processing load of the ECU 30 can be reduced and a used storage area of the RAM can be reduced.

Moreover, in the present embodiment, a period (a stoppage period from t101a to t102a indicated by "STOP" in FIG. 7) for temporarily suspending the acquisition of the sensor output is set at least in a part of a period (a pressure stabilization period) in which the fuel pressure at the installation position of the fuel pressure sensor 20a is stable in the period (the sensing period) set in the above-mentioned mode for sequentially acquiring the output of the fuel pressure sensor 20a as shown in FIG. 7. In more detail, if a lift amount of the needle 20c of the injector 20 (shown in FIG. 2) becomes sufficiently large to the extent that sufficient high-pressure fuel is supplied to the injection holes 20f (shown in FIG. 2), the injection rate R converges to a substantially constant value at an injection limit defined by a bore diameter of the injection hole 20f (i.e., a fuel outlet area). Therefore, in such the period, with the stabilization of the injection rate R, the pressure P sensed with the fuel pressure sensor 20a, i.e., the fuel pressure in the fuel passage where the sensor 20a is installed, is also stabilized. In the present embodiment, a start timing (timing t101a) of such the pressure stabilization period is sensed based on the sensor output (a pressure fluctuation mode) of the sensor 20a at each time. The start timing of the stoppage period is set at the start timing t101a of the sensed pressure stabilization period. More strictly, the start timing of the stoppage period is set at a timing when the start timing of the pressure stabilization period is decided. Furthermore, an end timing of the stoppage period is set at an injection end command timing (i.e., timing t102a) directed by the injection end command to the injector 20.

Thus, in the present embodiment, the above-described sensing period is further limited by providing the stoppage period t101a-t102a. Fundamentally, desired data (a waveform of the pressure fluctuation related to the injection) can be obtained even during such the further limited sensing periods t101-t101a, t102a-t102. It is because the period excluded by the above-described limitation of the sensing period is a period in which the fuel pressure P is stable and the fuel pressure P in such the excluded period can be fundamentally estimated by interpolation calculation and the like based on the pressure values before and after the stoppage period t101a-t102a. Since the sensing period is set as the further short and limited period, a processing load of the ECU 30 can be reduced further and a used storage area of the RAM can be reduced further.

Figure 8:
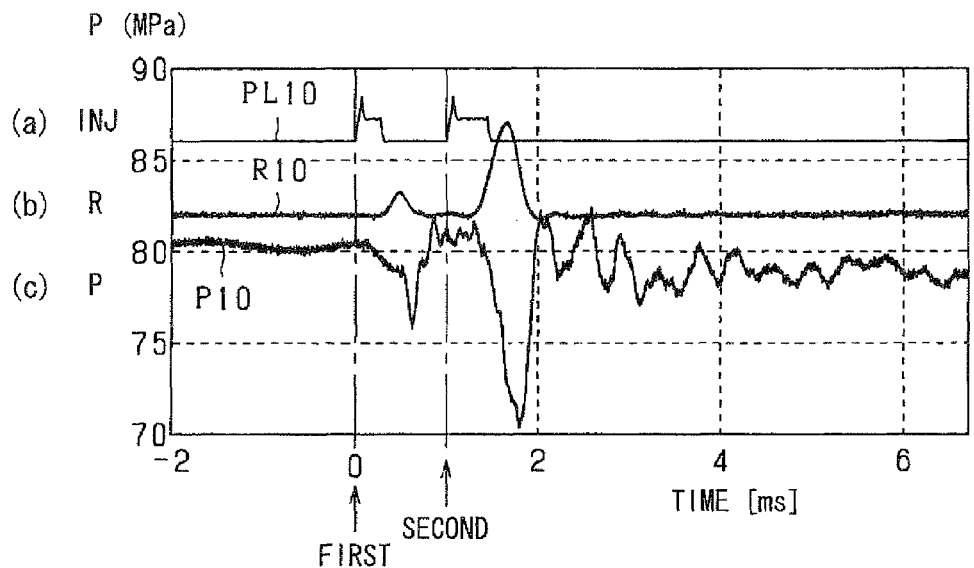
FIG. 8 is a time chart showing transitions of injection parameters according to the embodiment.

FIG. 8 is a time chart showing an example of the pressure transition waveform obtained in S21 of FIG. 5. In FIG. 8, a solid line PL10 in part (a) indicates a transition of the injection command signal INJ (the pulse signal) to the injector 20, a solid line R10 in part (b) indicates a transition of the injection rate R (the fuel quantity injected per unit time), and a solid line P10 in part (c) indicates a transition of the fuel pressure P (the inlet pressure) sensed with the above-described fuel pressure sensor 20a. FIRST in FIG. 8 indicates a first stage injection and SECOND is a second stage injection.

As shown in FIG. 8, the sensor output acquired in S21 of FIG. 5 contains a high-frequency noise. In the present embodiment, filtering processing is applied to the sensor output by letting the sensor output pass through a low-pass filter (or a band-pass filter). Then, in following S22 and S23, first order differential processing and second order differential processing are applied to the filtered data (the data from which the high-frequency noise is removed). Thus, the above-mentioned differential data are derived (calculated). Thus, the change in the fuel pressure P accompanying the change in the actual injection state or the injection operation state can be sensed with high accuracy.

FIG. 9 is a time chart showing an example of pressure transition waveforms acquired and stored (i.e., learned) through the processing shown in FIG. 5. In FIG. 9, part (a) is a time chart showing a transition of the injection rate R (i.e., the fuel quantity injected per unit time), part (b) is a time chart showing waveform data after the above-described filtering processing is applied to the sensor output, part (c) is a time chart showing waveform data after the first order differential processing is applied to the data having undergone the filtering processing, and part (d) is a time chart showing waveform data after the second order differential processing is applied to the data having undergone the filtering processing. In FIG. 9, chained lines show data of a fuel pressure level (fuel pressure immediately before injection) of 75 MPa, solid lines show data of a fuel pressure level of 80 MPa, and chain double-dashed lines show data of a fuel pressure level of 85 MPa, respectively.

As shown in part (b) of FIG. 9, the pressure transition after a rising timing of the injection command pulse to the injector 20 (i.e., the energization start timing equivalent to a timing before timing t0) indicates a following tendency as a general tendency. That is, there is a short period in which the pressure P is constant first, and after the period, the pressure P starts to gradually decrease at the timing to shown in FIG. 9. Then, the pressure P starts to decrease steeply at timing t1. The initial period in which the pressure P is constant and the following period t0-t1 in which the pressure P gradually decreases correspond to an invalid injection time (an invalid injection period) of the injector 20. In more detail, the invalid injection time is a summation of various kinds of delays such as a delay since the energization (rising of the injection command pulse) occurs until a normal magnetic field is formed by the solenoid 201b (shown in FIG. 2) and an operation delay due to an inertia of the outer valve 202b, the needle 20c and the like (shown in FIG. 2), an inertia of the fuel, a friction with a wall surface inside the nozzle, and the like. The invalid injection time is equivalent to a time since the drive (the energization) of the injector 20 is started until the fuel is actually injected.

The pressure P decreases gradually in a period after the period of the constant pressure P in the invalid injection period. This shows that pressure leak is caused by the injection operation of the injector 20. More specifically, this phenomenon occurs because the injector 20 is an injector of a type that is accompanied by pressure leak during a period since the injector starts an operation concerning the injection (i.e., an opening operation of the outer valve 202b) until the injection is actually started. More specifically, as mentioned above, the injector 20 returns the fuel in the oil pressure chamber Cd to the fuel tank 10 by opening the orifice of1 to drive the needle 20c when the injector 20 is energized (ON). Therefore, the fuel pressure due to the common rail 12 leaks through the orifice of1 (shown in FIG. 2) during the injection operation of the injector 20. That is, the pressure drop at the time (i.e., the pressure drop in the period from to t1) corresponds to the gentle decrease of the pressure P (i.e., the pressure leak) in the above-described invalid injection period.

As contrasted thereto, a pressure drop point (i.e., the timing t1) when the pressure P starts to fall steeply corresponds to the timing when the injection is actually started through the injector 20 (i.e., the injection start timing).

As shown in FIG. 9, the pressure transition (the pressure transition waveform) after the above-described injection start timing (the timing t1) has a following tendency as a general tendency. That is, a transition is made from the steep pressure drop at the timing t1 to a pressure local minimum point at timing t2 and a stable period of the pressure value at the pressure minimum point, and then, a transition is made to pressure increase at timing t2a. After that, the pressure P is stabilized once at timing t2b but rises steeply at timing t3 again. If the pressure P eventually reaches a level near a pressure value before the injection (i.e., a zero cross point) at timing t4, the pressure P surges (pulsates) near the pressure value.

The timing t2 corresponds to a timing when the injection rate R is maximized (hereinafter, referred to as a maximum injection rate reaching timing). The timing t2a corresponds to a timing when the outer valve 202b closes. The timing t3 corresponds to a timing when the injection rate R starts to decrease after reaching the maximum injection rate (hereinafter, referred to as an injection rate decrease start timing). The timing t4 corresponds to a timing when the injection by the injector 20 stops, i.e., the injection end timing. Like the invalid injection time in the injection start, there occurs a delay from the de-energization (i.e., falling of the injection command pulse) to the injection end timing (the timing t4) also in the injection end of the injector 20.

Next, processing for detecting the respective timings (timings t1-t4) concerning the above-described fuel injection will be explained in detail with reference to FIGS. 9 to 16 based on the pressure transition waveforms shown in parts (b) to (d) of FIG. 9, i.e., the pressure transition waveforms acquired and stored (i.e., learned) thought the processing of FIG. 5. FIGS. 10 and 12 to 14 are flowcharts showing a series of processing concerning the detection of the respective timings. Fundamentally, a series of processing shown in the drawings is serially performed at a predetermined interval (e.g., at an interval of 20 μsec) through execution of programs stored in the ROM by the ECU 30. Through the execution of the processing, the detection and the storage of the above-described timings are performed once per injection. That is, in the case of a single-stage injection, a set of the detection and storage is performed once per combustion cycle. In the case of a two-stage injection, two sets of the detection and storage are performed per combustion cycle. Values of various parameters used in the processing shown in the respective drawings are serially stored in the storage device mounted in the ECU 30 such as the RAM, the EEPROM or the backup RAM and are updated at any time when necessary like the processing shown in FIG. 5.

Figure 10:
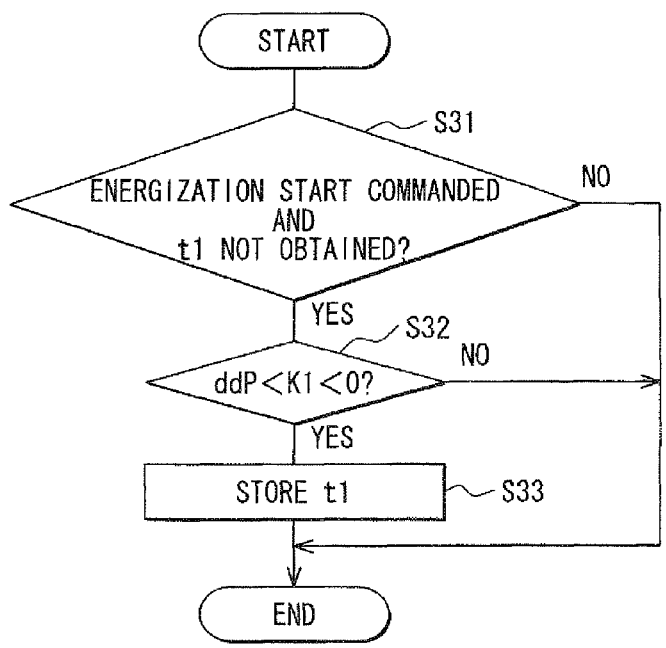
FIG. 10 is a flowchart showing a series of processing for detecting an injection start timing according to the embodiment.

Processing shown in FIG. 10 is for detecting the above-described injection start timing (the timing t1).

As shown in FIG. 10, in a series of the processing, first in S31, it is determined whether the injection start command (the energization start) of a certain injection has been outputted and the timing t1 has not been detected yet. Only when it is determined that the injection start command of the certain injection has been outputted and the timing t1 has not been detected yet in S31, processing from S32 is performed. That is, a period in which the condition of S31 is satisfied corresponds to a detection period of the above-described timing t1.

In S32, it is determined whether the pressure second order differential value ddP calculated in S23 of FIG. 5 is smaller than a predetermined threshold value K1 (ddP<K1).

The threshold value K1 is set at a value smaller than 0 (K1<0), i.e., at a negative value. When the value K1 is set, the value K1 is variably set based on multiple maps obtained through experiments and the like beforehand, e.g., maps shown in FIGS. 11A to 11C. This responds to the phenomenon that the inclination of the pressure drop (shown in FIG. 9) accompanying the above-mentioned injection start changes in accordance with the fuel pressure P immediately before the injection (i.e., the fuel pressure level at the time of the stability before the timing to of FIG. 9), the injection execution timing, the cylinder pressure and the like. That is, the threshold value K1 is set at a smaller value (i.e., at a larger value on the negative side) as the inclination of the pressure drop becomes steeper.

Figure 11A:
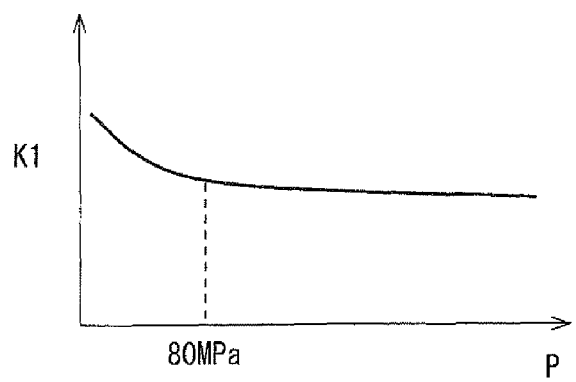
FIGS. 11A to 11C are maps for variably setting a threshold value used for detecting the injection start timing according to the embodiment.

FIG. 11A is a map showing a relationship between the fuel pressure level P (i.e., the actual measurement value measured by the fuel pressure sensor 20a) and an adaptation value (i.e., the optimum value) of the threshold value K1 obtained by experiment and the like. As shown in FIG. 11A, according to the map, the threshold value K1 is set at a smaller value as the fuel pressure level P increases before the fuel pressure level P reaches a convergence point (80 MPa, in this example). If the fuel pressure level P reaches the convergence point, a degree of the decrease in the threshold value K1 with respect to the increase in the fuel pressure level P becomes very small.

Figure 11B:
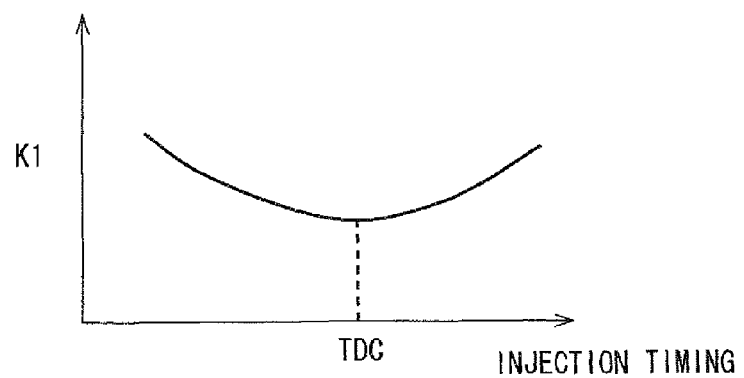

FIG. 11B is a map showing a relationship between the injection execution timing and the adaptation value (i.e., the optimum value) of the threshold value K1 obtained through experiment and the like. The injection execution timing is detected as the injection start command timing directed by the injection start command to the injector 20, or in more detail, as the rising timing of the injection command pulse (i.e., the energization start timing). As shown in FIG. 11B, according to the map, the threshold value K1 is set at a smaller value as the injection execution timing comes closer to TDC (a top dead center).

Figure 11C:
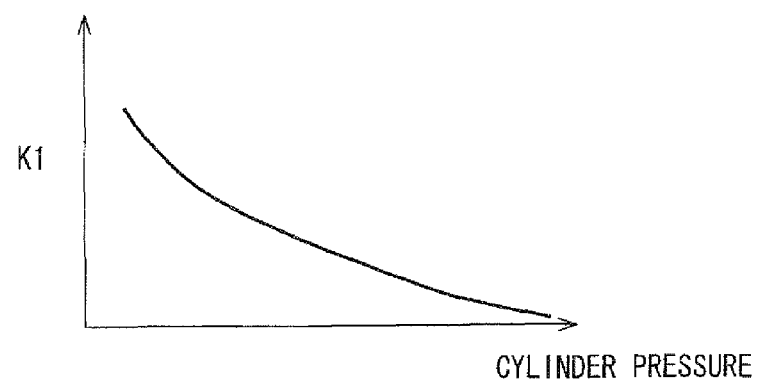

FIG. 11C is a map showing a relationship between the pressure inside the cylinder of the target engine (i.e., the actual measurement value measured by the cylinder pressure sensor 53 shown in FIG. 3) and the adaptation value (the optimum value) of the threshold value K1 obtained through experiment and the like. As shown in FIG. 11C, according to the map, the threshold value K1 is set at a smaller value as the cylinder pressure increases.

Thus, in the present embodiment, the threshold value K1 is variably set in accordance with the inclination of the pressure drop. Accordingly, the above-described pressure drop accompanying the injection and eventually the injection start timing (the timing t1 shown in FIG. 9) can be detected with high accuracy.

The processing of S32 is repeatedly performed in the detection period of the timing t1. The series of the processing of FIG. 10 is ended if it is determined that the pressure second order differential value ddP is not smaller than the threshold value K1 in S32. If it is determined that the pressure second order differential value ddP is smaller than the threshold value K1, the present timing is stored as the injection start timing (the timing t1) in a predetermined storage device in following S33. In this case, it is effective to store the timing in a predetermined storage device (for example, the EEPROM or the backup RAM) capable of holding the data even after the stoppage of the main power supply to the ECU 30, while relating the data of the timing to a predetermined parameter (for example, an engine state as of the data acquisition) if needed. Thus, the data is held in the storage device in a nonvolatile manner without being erased even after the target engine is stopped and the power supply to the ECU 30 is blocked out. As a result, preservation of the data and eventually read-out of the data over a long period of time are enabled. If the data is related to the predetermined parameter when the data is stored, the data retrieval is facilitated by using the parameter when the data is read. Thus, data analysis and the like can be performed easily and appropriately.

Thus, in the present embodiment, the timing when the pressure drop accompanying the injection start occurs or eventually the injection start timing (the timing t1 of FIG. 9) is detected as the timing (a cross point), at which the pressure second order differential value ddP shifts from a larger side to a smaller side than the threshold value K1. With such the detection scheme, the above-described pressure drop can be grasped accurately and eventually the injection start timing can be detected accurately.

Figure 12:
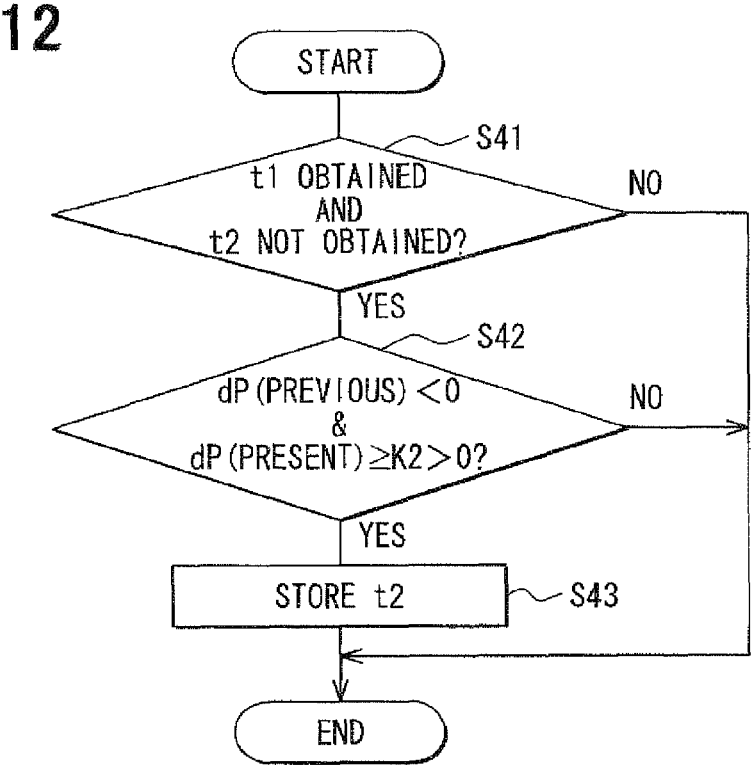
FIG. 12 is a flowchart showing a series of processing for detecting a maximum injection rate reaching timing according to the embodiment.

Processing shown in FIG. 12 is for detecting the above-described maximum injection rate reaching timing (i.e., the timing t2).

As shown in FIG. 12, in a series of the processing, first in S41, it is determined whether the timing t1 of the aforementioned injection has been detected and the timing t2 of the injection has not been detected yet. Only when it is determined that the timing t1 of the injection has been detected and the timing t2 of the injection has not been detected yet in S41, processing from S42 is performed. That is, a period in which the condition of S41 is satisfied corresponds to a detection period of the above-described timing t2.

In S42, it is determined whether the previous value of the pressure first order differential value dP calculated in S 22 of FIG. 5 is smaller than 0 (i.e., dP(previous)<0) and the present value of the pressure first order differential value dP is equal to or greater than a predetermined threshold value K2 (i.e., dP(present)≧K2). The threshold value K2 may be a fixed value or a variable value. The threshold value K2 is set at a value greater than 0, i.e., a positive value (k2>0).

The processing of S42 is repeatedly performed in the detection period of the timing t2. If it is not determined in S42 that dP(previous)<0 and dP(present)≧K2, the series of the processing of FIG. 12 is ended. If it is determined in S42 that dP(previous)<0 and dP(present)≧K2, the present timing is stored as the maximum injection rate reaching timing (the timing t2 shown in FIG. 9) in a predetermined storage device (for example, the EEPROM, the backup RAM or the like) in following S43.

Thus, in the present embodiment, the timing when the fuel pressure P is stabilized after the end of the steep decrease of the fuel pressure P caused at the injection start or eventually the maximum injection rate reaching timing (the timing t2 shown in FIG. 9) is detected as the timing (a cross point), at which the pressure first order differential value dP shifts from a smaller side to a larger side than the threshold value K2. With such the detection scheme, the above-described timing when the fuel pressure P stabilizes can be grasped accurately, and eventually the maximum injection rate reaching timing can be detected accurately.

Figure 13:
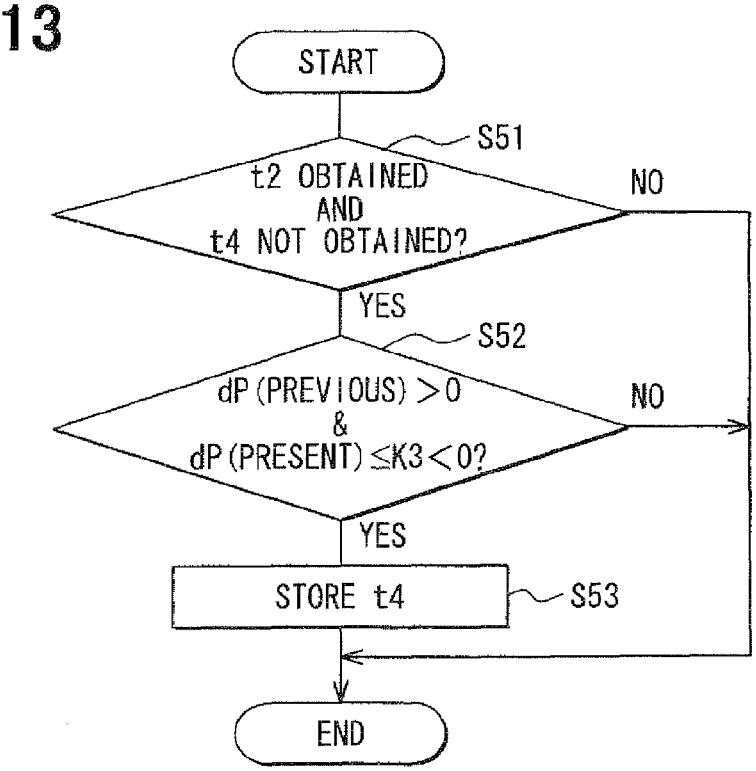
FIG. 13 is a flowchart showing a series of processing for detecting an injection end timing according to the embodiment.

Processing shown in FIG. 13 is for detecting the above-described injection end timing (timing t4).

As shown in FIG. 13, in a series of the processing, first in S51, it is determined whether the timing t2 of the aforementioned injection has been detected and the timing t4 of the injection has not been detected yet. Only when it is determined that the timing t2 of the injection has been detected and the timing t4 of the injection has not been detected yet in S51, processing from S52 is performed. That is, a period in which the condition of S51 is satisfied corresponds to a detection period of the above-described timing t4.

In S52, it is determined whether a previous value of the pressure first order differential value dP calculated in S22 of FIG. 5 is greater than 0 (dP(previous)>0) and a present value of the pressure first order differential value dP is equal to or smaller than a predetermined threshold value K3 (i.e., dP(present)≦K3). The threshold valve K3 may be a fixed value or a variable value. The threshold value K3 is set at a value smaller than 0, i.e., a negative value (K3<0).

The processing of S52 is repeatedly performed in the detection period of the timing t4. If it is not determined in S52 that dP(previous)>0 and dP(present)≦K3, the series of the processing of FIG. 13 is ended. If it is determined in S52 that dP(previous)>0 and dP(present)≦K3, the present timing is stored as the injection end timing (the timing t4 shown in FIG. 9) in a predetermined storage device (for example, the EEPROM, the backup RAM or the like) in following S53.

Thus, in the present embodiment, the timing when the pulsation of the fuel pressure P starts after the end of the steep increase of the fuel pressure P due to the closing of the injector or eventually the injection end timing (the timing t4 shown in FIG. 9) is detected as the timing (a cross point), at which the pressure first order differential value dP shifts from a larger side to a smaller side than the threshold value K3. With such the detection scheme, the change in the above-described pressure fluctuation mode can be grasped accurately, and eventually the injection end timing can be detected accurately.

Figures 14, 15A, 15B:
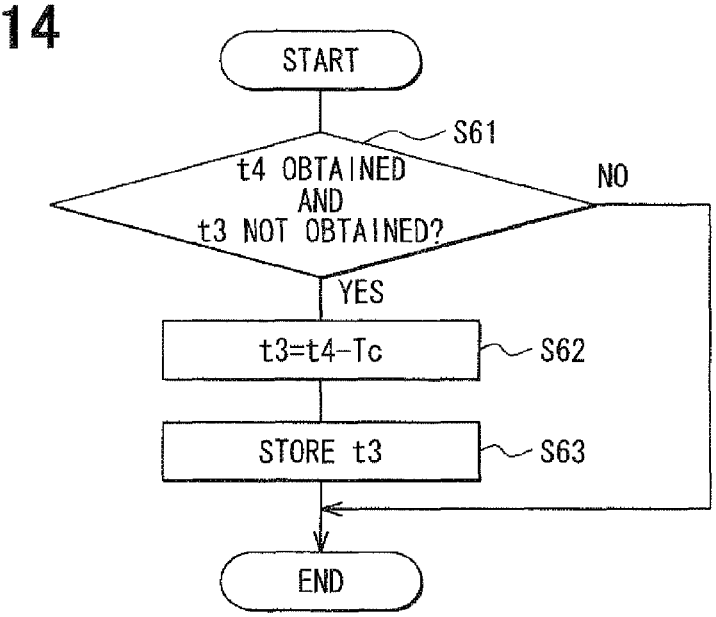
FIG. 14 is a flowchart showing a series of processing for detecting a timing at which an injection rate starts decreasing after reaching a maximum injection rate according to the embodiment.
FIGS. 15A and 15B are maps for variably setting a return time used for detecting an injection rate decrease start timing according to the embodiment.

Processing shown in FIG. 14 is for detecting a timing (the timing t3), at which the injection rate R starts to decrease after reaching the above-described maximum injection rate (at the timing t2).

As shown in FIG. 14, in a series of the processing, first in S61, it is determined whether the timing t4 of the aforementioned injection has been detected and the timing t3 of the injection has not been detected yet. Only when it is determined that the timing t4 of the injection has been detected and the timing t3 of the injection has not been detected yet in S61, processing from S62 is performed.

In S62, the timing (i.e., the timing t3 shown in FIG. 9), at which the injection rate R starts to decrease after reaching the maximum injection rate, is detected as a timing earlier than the injection end timing (the timing t4) by a predetermined return time Tc (t3=t4−Tc). In following S63, the timing t3 is stored in a predetermined storage device (for example, the EEPROM, the backup RAM or the like).

The return time Tc is variably set based on multiple maps obtained through experiments and the like beforehand, e.g., maps shown in FIGS. 15A and 15B. This responds to the phenomenon that the time since the injection rate R starts to decrease until the injection ends changes in accordance with the fuel pressure P immediately before the injection (i.e., the fuel pressure level at the time when the pressure is stable) and the injection period.

FIG. 15A is a map showing a relationship between the fuel pressure level (i.e., the actual measurement value measured by the fuel pressure sensor 20a) and an adaptation value (i.e., the optimum value) of the return time Tc obtained through the experiment and the like. As shown in FIG. 15A, according to the map, the return time Tc is set at a shorter time as the fuel pressure level P (i.e., base pressure) increases.

FIG. 15B is a map showing a relationship between the injection period (which is detected as pulse width TQ of the injection command, for example) and an adaptation value (i.e., the optimum value) of the return time Tc obtained through the experiment and the like. As shown in FIG. 15B, according to the map, the return time Tc is set at a longer time as the injection period lengthens.

Thus, in the present embodiment, the timing (the timing t3 shown in FIG. 9) at which the injection rate R starts decreasing after reaching the above-described maximum injection rate is detected based on a relative positional relationship between the timing t3 and the timing t4, which is detected through the processing shown in FIG. 13. With such the detection scheme, the timing t3 shown in FIG. 9 can be detected easily and accurately.

Thus, in the present embodiment, the injection start timing, the maximum injection rate reaching timing, the timing at which the injection rate starts decreasing after reaching the maximum injection rate, and the injection end timing are sequentially detected for each injection (each of the multiple injections performed during a combustion cycle in the case of the multi-injection) respectively through the processing shown in FIGS. 5, 10, and 12 to 14 based on the output of the above-described fuel pressure sensor 20a. In addition, the correction coefficients used in S12 of FIG. 4 (more strictly, the coefficients concerning the above-described timings out of multiple kinds of coefficients) are sequentially updated based on the respective detected timings. In more detail, the above-described detection values of the respective timings are compared with reference values (held as a map) of the respective timings, and the correction coefficients for compensating the errors (deviations) are calculated. FIG. 16 is a table showing detection modes of the respective timings t1 to t4.

As explained above, the fuel injection characteristic sensing device and the fuel injection command correcting device according to the present embodiment can exert following outstanding effects.

(1) The fuel injection characteristic sensing device according to the above-described embodiment is applied to the common rail type fuel injection system that has the common rail 12 and the fuel pressure sensor (the fuel pressure sensor 20a). The common rail 12 accumulates the fuel to be supplied to a predetermined injector (the injector 20 of each cylinder) under pressure. The fuel pressure sensor senses the pressure of the fuel flowing through the inside of the fuel passage extending from the common rail 12 to the fuel injection hole (the injection hole 20f) of the injector 20 at the predetermined point downstream of the neighborhood of the fuel discharge hole of the common rail 12 with respect to the fuel flow direction in the fuel passage, or more specifically, at a point on the injector 20 side of the connection section 12a (i.e., the orifice), or further specifically, at the fuel inlet of the injector 20 corresponding to a position closer to the fuel injection hole of the injector 20 than the common rail 12. The device has the program (a fuel pressure sensing section: S21 of FIG. 5) that sequentially senses the fuel pressure at the above-described predetermined point (sensing point) corresponding to the sensor 20a based on the outputs of the fuel pressure sensor 20a. The device has the program (an injection timing detecting section: FIGS. 10, 12, and 13) that detects the predetermined timings (injection timings) in a series of operations concerning the fuel injection of the injector 20 of each cylinder based on the fuel pressure sequentially sensed by the processing of S21. With such the construction, for example, the injection start timing (the timing t1), the maximum injection rate reaching timing (the timing t2) and the injection end timing (the timing t4) of the injector 20 can be detected with high accuracy.

(2) The fuel pressure sensor 20a is provided on the injector 20 side of the connection section 12a (the orifice). Therefore, the pressure fluctuation mode can be sensed with the fuel pressure sensor 20a before the fuel pulsation is reduced by the orifice. Eventually, the pressure fluctuation mode can be sensed with high accuracy.

(3) A rail pressure sensor, which is generally attached to the common rail 12, is omitted in the above embodiment, so a wide space can be ensured near the common rail 12. With the structure having the above-described fuel pressure sensor 20a, the usual fuel injection control can be performed appropriately based on the sensor output of the fuel pressure sensor 20a even if the rail pressure sensor is thus omitted.

(4) In the processing of FIG. 5, the sensor output of the above-described fuel pressure sensor 20a is sequentially obtained at a relatively short interval, at which the profile of the pressure transition waveform can be plotted with the sensor output. Thus, the above-described pressure transition waveform (i.e., the pressure fluctuation mode) can be appropriately sensed with high accuracy.

(5) In the processing of FIG. 5, the sensor output of the above-described fuel pressure sensor 20a is sequentially obtained at an interval of 20 μsec. Thus, the above-described pressure transition waveform (i.e., the pressure fluctuation mode) can be grasped appropriately.

(6) The fuel pressure sensor 20a is provided to each one of the fuel inlets of the injectors 20 of the cylinders #1-#4. Thus, mountability and maintenance performance of each fuel pressure sensor 20a are improved and the pressure can be sensed with high accuracy and relatively high stability.

(7) The device has the program (a differentiating section: S22 and S23 of FIG. 5) that calculates the differential data by applying the first order and second order differential processing to the fuel pressure data sequentially sensed in S21 of FIG. 5. In the processing shown in FIGS. 10 and 12 to 14, the predetermined timings (timings t1, t2, t4) in a series of operations concerning the fuel injection of the above-described injector 20 are detected based on the differential data obtained by the processing of S22 and S23 of FIG. 5. Thus, the above described timings t1, t2, t4 can be detected with higher accuracy.

(8) In the processing shown in FIG. 10, an inflection point of the pressure transition is obtained as a start point of steep pressure drop, in which a pressure change amount per unit time exceeds a predetermined level (level corresponding to the threshold value K1), or for example, as a timing at which the second order differential value ddP of the fuel pressure P acquired through the processing of S23 of FIG. 5 shifts from a larger side to a smaller side than a predetermined threshold value (the threshold value K1). In the processing shown in FIG. 10, the injection start timing (the timing t1) of the above-described injector 20 is detected based on the pressure inflection point. Thus, the timings can be detected appropriately.

(9) In S32 of FIG. 10, the pressure inflection point in the predetermined period (set in S31 of FIG. 10), whose start timing is set at the injection start command timing (i.e., the rising timing of the injection command pulse) directed by the injection start command to the above-described injector 20, is obtained. In S33 shown in FIG. 10, the injection start timing (the timing t1) of the above-described injector 20 is detected based on the pressure inflection point. Thus, the injection start timing can be detected with high accuracy.

(10) The device has the program that variably sets the threshold value (threshold value K1) concerning the cross point in accordance with the fuel pressure immediately before the injection (i.e., the fuel pressure level in a stable period) (refer to FIG. 11A). Thus, the pressure drop and eventually the injection start timing can be detected with high accuracy.

(11) The device has the program that variably sets the threshold value (threshold value K1) concerning the cross point in accordance with the injection start command timing directed by the injection start command to the above described injector 20 (refer to FIG. 11B). Thus, the pressure drop and eventually the injection start timing can be detected with high accuracy.

(12) The device has the program that variably sets the threshold value (threshold value K1) concerning the cross point in accordance with the pressure in the cylinder 50 of the target engine (i.e., the cylinder pressure) (refer to FIG. 11C). Thus, the pressure drop and eventually the injection start timing can be detected with high accuracy.

(13) In the processing of FIGS. 12 and 13, through the processing of S22 and S23 of FIG. 5, the timing (the cross point) at which the n-th order differential value (n is an integer equal to or greater than 1) of the fuel pressure shifts from a smaller side to a larger side than a predetermined threshold value or shifts from the larger side to the smaller side than the predetermined threshold value is calculated based on the n-th order differential value of the fuel pressure in a predetermined period. In the processing of FIGS. 12 and 13, the maximum injection rate reaching timing and the injection end timing (the timings t2 and t4) of the above-described injector 20 are detected based on the cross point. Thus, the above-described timings can be detected with high accuracy.

(14) In the processing of FIG. 12, based on the first order differential value of the fuel pressure in the predetermined period, the timing (the cross point) when the first order differential value of the fuel pressure shifts from the smaller side to the larger side than the predetermined threshold value (the threshold value K2) is obtained as the end point of the steep pressure drop, in which the pressure change amount per unit time exceeds the predetermined level (the level corresponding to the threshold value K2). In the processing of FIG. 12, the maximum injection rate reaching timing (the timing t2) of the above-described injector 20 is detected based on the cross point. Thus, the above-described timing when the pressure stabilizes can be surely grasped, and eventually the maximum injection rate reaching timing can be detected with high accuracy.

(15) In the processing of FIG. 13, based on the first order differential value of the fuel pressure in the predetermined period, the timing (the cross point) when the first order differential value of the fuel pressure shifts from the larger side to the smaller side than the predetermined threshold value (the threshold value K3) is obtained as the end point of the steep pressure increase, in which the pressure change amount per unit time exceeds the predetermined level (the level corresponding to the threshold value K3). In the processing shown in FIG. 13, the injection end timing (the timing t4) of the above-described injector 20 is detected based on the cross point. Thus, the change in the above-described pressure fluctuation mode of the fuel pressure can be surely grasped, and eventually the injection end timing can be detected with high accuracy.

(16) In S22 and S23 of FIG. 5, filtering processing (for example, filtering processing by a low-pass filter) for cutting high frequency is applied to the fuel pressure data sequentially sensed by the processing of S21 of FIG. 5. Then, first order and second order differential processing is applied to the data having undergone the filtering processing to derive the above-described differential data. Thus, by applying the differential processing to the data having undergone the filtering processing, the change of the fuel pressure accompanying the change of the actual injection state or the injection operation state can be detected with high accuracy, and eventually, the above-described respective timings can be detected with high accuracy.

(17) In the processing of FIG. 10, the predetermined timing in a series of operations concerning the fuel injection of the above-described injector 20, i.e., the injection end timing (first injection timing), is detected based on the fuel pressure sequentially sensed by the processing of S21 of FIG. 5. The device has the program (a second injection timing detecting section: FIG. 14) that detects a predetermined timing other than the timing t4 among the timings in a series of operations concerning the fuel injection of the above-described injector 20, that is, the timing t3 (a second injection timing) at which the injection rate starts decreasing after reaching the maximum injection rate, based on the relative positional relationship between the timing t3 and the timing t4. In more detail, in the processing of FIG. 14, the timing earlier than the injection end timing t4 by the predetermined return time Tc is detected as the above-described timing t3. Thus, the timing t3 at which the injection rate starts decreasing after reaching the maximum injection rate can be detected (estimated) easily from another injection timing (the timing t4).

(18) The device has the program that variably sets the return time Tc in accordance with the fuel pressure immediately before the injection (i.e., the fuel pressure level in the stable period) (refer to FIG. 15A). Thus, the injection rate decrease start timing t3 can be detected with high accuracy.

(19) The device has the program that variably sets the return time Tc in accordance with the injection period (which is equivalent to the pulse width of the injection command, for example) (refer to FIG. 15B). Thus, the injection rate decrease start timing t3 can be detected with high accuracy.

(20) The detection of the multiple timings in a series of operations concerning the fuel injection of the above-described injector 20 is enabled by the processing of FIGS. 12 and 13. In S21 of FIG. 5, the fuel pressure of each time is sequentially sensed in a predetermined period, whose start timing is set to the timing when the predetermined one (the timing t1 or t2) among the multiple timings in a series of operations concerning the fuel injection of the above-described injector 20 is detected. The predetermined period is set in S41 of FIG. 12 or S51 of FIG. 13. In the processing of FIG. 12 or 13, the predetermined timing (the timing t2 or t4) in a series of operations concerning the fuel injection of the above-described injector 20 is detected based on the fuel pressure in the predetermined period. Thus, by setting the detection period based on one timing, another injection timing (the next timing of the detected timing) can be easily and exactly detected in the detection period set as the suitable period.

(21) The injection command correcting device has the program (a correcting section) that corrects the injection command to the above-described injector 20 using the predetermined timings (timings t1 to t4) concerning the fuel injection detected by the above-described fuel injection characteristic sensing device. When the error in each of the thus detected timings t1 to t4 with respect to each corresponding reference timing (i.e., an appropriate value beforehand obtained by the experiment or the like) is large, the injection command to the injector 20 is corrected such that the injection result during the present combustion cycle is reflected in the injection in the subsequent combustion cycle, for example. Thus, the error can be compensated. By continuously performing the correction of the injection command while applying such the feedback to the injection command, the fuel injection at appropriate timing can be performed over a long period of time.

The above embodiment may be modified as follows, for example.

In the above-described embodiment, the orifice is provided in the connection section 12a to reduce the pressure pulsation in the common rail 12. Alternatively, a flow damper (a fuel pulsation reducing section) may be provided in place of the orifice or together with the orifice to reduce the pressure pulsation in the common rail 12.

In the above-described embodiment, the sensing period and the stoppage period are set in the mode shown in FIG. 6 or 7. The present invention is not limited thereto but the sensing period or the stoppage period may be set in an arbitrary mode. The sensing period or the stoppage period may be set as a fixed value obtained through experiment or the like. Alternatively, the sensing period or the stoppage period may be set using a map or the like as a variable value corresponding to the situation of each time (specifically, the engine operation state). The stoppage period may be omitted if it is unnecessary.

In the above-described embodiment, the device has the program that variably sets the threshold value K1 or the return time Tc in accordance with the fuel pressure immediately before the injection. The present invention is not limited thereto. Alternatively, the threshold value K1 or the return time Tc may be variably set in accordance with a parameter indicating a value equivalent to the fuel pressure immediately before the injection in place of the fuel pressure immediately before the injection. That is, the threshold value K1 or the return time Tc may be variably set in accordance with an estimate of the fuel pressure level.

In the above described embodiment, the injector 20 has the fluid control valve (i.e., the outer valve 202b) that controls the inflow of the fluid to the predetermined space (i.e., the oil pressure chamber Cd) and the outflow of the fluid from the oil pressure chamber Cd and the needle 20c that performs reciprocation operation inside the valve body of the aforementioned injector 20 in accordance with the pressure change of the oil pressure chamber Cd accompanying the inflow and the outflow of the fluid to open and close the fuel supply passage extending to the injection hole 20f (fuel injection hole), thereby performing the valve opening and the valve closing of the injector 20. In such the case, the device may be constructed to detect the valve opening timing (timing t0 shown in FIG. 9) or the valve-closing timing (timing t2a shown in FIG. 9) of the outer valve 202b as the start point of the steep pressure drop or the steep pressure increase, in which the pressure change amount per unit time exceeds the predetermined level, or in more detail, as a timing when the first order differential value of the fuel pressure acquired through the processing of S23 of FIG. 5 shifts from a larger side to a smaller side or from a smaller side to a larger side than a predetermined threshold value, for example. With such the construction, the above-mentioned timings can be detected appropriately, and eventually the state of the above-described injector 20 can be grasped precisely. As a result, precise injector control can be performed in accordance with the situation of each time.

The injection command to the above-described injector 20 may be corrected during one combustion cycle. For example, in order to use a timing related to a predetermined event concerning the fuel injection (for example, the timing t1 at which the injector 20 starts the injection) detected by the fuel injection characteristic sensing device in a certain combustion cycle of the target engine for adjusting a timing of a predetermined operation concerning the fuel injection of the injector (for example, the valve closing timing t4 of the injector 20) to be performed after the detected timing of the predetermined event in the same combustion cycle, the device may include a program that corrects the injection command to the injector 20 (for example, the energization period (pulse width) of the injector 20) related to the predetermined operation concerning the fuel injection. Thus, the injection quantity error due to the injection start timing deviation can be compensated and the fuel injection quantity at the time can be maintained to be appropriate.

In the above-described embodiment, adoption of the adaptation map (used in S12 of FIG. 4), whose adaptation values are decided beforehand through the experimentation or the like, is supposed, and the correction coefficient for correcting the injection characteristic based on the adaptation map is updated. Alternatively, in place of the correction coefficient, the corrected value (i.e., a value reflecting the correction coefficient) may be stored in the EEPROM or the like. If the corrected value has sufficient reliability with such construction, a construction not requiring the above-described adaptation map, i.e., an adaptation-less construction, can be adopted.

An inflection point of the pressure transition may be obtained as a starting point of steep pressure increase, in which a pressure change amount per unit time exceeds a predetermined level, or for example, as a timing at which a second order differential value ddP of the fuel pressure P acquired through the processing of S23 of FIG. 5 shifts from a smaller side to a larger side than a predetermined threshold value. Then, the timing (the timing t3) when the injection rate R starts decreasing after reaching the maximum injection rate of the above-described injector 20 may be detected based on the pressure inflection point (refer to part (d) of FIG. 9). Thus, the timing t3 can be detected appropriately.

The target timing (each of the timings t1 to t4) may be detected based on a differential value at a predetermined timing (for example, the minimum value or the maximum in a predetermined period).

Instead of treating the detected cross point as the target timing (each of the timings t1 to t4), a timing based on the cross point may be treated as the target timing. For example, a certain timing that is close to the cross point but is distant from the cross point by a predetermined distance may be treated as the target timing.

For example, for data analysis or the like, it is effective to provide the device with a program that detects the multiple cross points or the multiple pressure inflection points without deciding the detection period, that is, that detects the multiple cross points or the multiple pressure inflection points through processing similar to the processing of FIGS. 10, 12 and 13 (for example, processing of FIGS. 10, 12 and 13 without S31, S41 and S51), and, in such the state, determines whether these cross points or the pressure inflection points are the target cross points or the target pressure inflection points (i.e., the cross points or the pressure inflection points related to the target timings) based on detection timings of the cross points or the pressure inflection points (i.e., by comparing the detection timings with the detection timings of the other timings). Alternatively, it is effective to provide the device with a program that counts the cross points or the pressure inflection points in a chronological order, e.g., for every combustion cycle, and that determines whether each one of the cross points or the pressure inflection points is the target cross point or the target pressure inflection point based on the position of the each one of the cross points or the pressure inflection points in the chronological order.

It is also effective to provide the device with a program that detects the multiple cross points or the multiple pressure inflection points without deciding the detection period, that is, that detects the multiple cross points or the multiple pressure inflection points through processing similar to the processing of FIGS. 10, 12 and 13 (for example, processing of FIGS. 10, 12 and 13 without S31, S41 and S51), and, in each time of the detection, determines whether the cross point or the pressure inflection point is the target cross point or the target pressure inflection point (i.e., the cross point or the pressure inflection point related to the target timing) based on detection timing of the cross point or the pressure inflection point (i.e., by comparing the detection timing with the detection timing of the other timing). Alternatively, it is effective to provide the device with a program that counts up (+1) the cross point or the pressure inflection point every time the cross point or the pressure inflection point is detected and that determines whether the cross point or the pressure inflection point is the target cross point or the target pressure inflection point based on the position of the cross point or the pressure inflection point in the chronological order.

It is also effective to construct the device such that the device detects a node, a local maximum point and a local minimum point of the above-mentioned pulsation pattern (the pressure waveform) based on the time differential value of the fuel pressure. The differential value is 0 at the local maximum point or the local minimum point. The differential value is maximized at the node.

The use of the above-described fuel injection characteristic sensing device is not limited to the correction of the injection command described above. Alternatively, for example, the device may be used for data analysis based on data accumulation, failure diagnosis of the fuel injection system based on the error in the predetermined timing detected by the device and the like. With such the failure diagnosis, fail safe processing or the like can be performed in an early stage of the failure.

In place of the electromagnetic drive injector 20 shown in FIG. 2, a piezo drive injector may be used. Alternatively, an injector that does not cause pressure leak such as a direct acting injector that transmits the drive power not through the oil pressure chamber Cd (for example, a direct acting piezo injector having been developed in recent years) can be also used. In the case where the direct acting injector is used, control of the injection rate is facilitated.

Moreover, an injector that opens/closes an injection hole with a needle or an injector of an outward valve opening type may be employed.

In the above-described embodiment, the fuel pressure sensor 20a for sensing the fuel pressure is attached to the fuel inlet of the above-described injector 20. Alternatively, the fuel pressure sensor 20a may be provided inside the injector 20 (for example, near the injection hole 20f shown in FIG. 2). An arbitrary number of the fuel pressure sensor(s) may be used. For example, two or more sensors may be provided to the fuel flow passage of one cylinder. In the above-described embodiment, the fuel pressure sensor 20a is provided to every cylinder. Alternatively, the sensor(s) may be provided only in a part of the cylinders (for example, one cylinder), and an estimate based on the sensor output may be used for the other cylinder(s).

In the above-described embodiment, the cylinder pressure sensor 53 is provided to every cylinder. Alternatively, the sensor(s) may be provided only in a part of the cylinders (for example, one cylinder). In the case where the cylinder pressure sensor(s) is/are provided only in a part of the cylinders in this way without providing the sensor(s) in the other cylinder (s), it is effective to estimate the cylinder pressure of the other cylinder(s) using the actual measurement value of the cylinder pressure obtained in the cylinder(s) provided with the cylinder pressure sensor(s). Thus, the cylinder pressure of many cylinders can be measured while minimizing the number of the sensor(s) and a computation load. Moreover, the injection characteristics (the injection quantity and the like) can be controlled with high accuracy based on the measurement value. The cylinder pressure sensor 53 may be omitted if it is unnecessary.

In the above-described embodiment, the sensor output of the above-described fuel pressure sensor 20a is sequentially acquired at an interval (i.e., in a cycle) of 20 μsec. The acquisition interval may be arbitrarily changed in a range capable of grasping the tendency of the pressure fluctuation mentioned above. However, according to the experiment performed by the inventors, an interval shorter than 50 μsec is effective.

It is also effective to provide a rail pressure sensor for measuring the pressure in the common rail 12 in addition to the above-described fuel pressure sensor 20a. With such the construction, the pressure in the common rail 12 (the rail pressure) can be acquired in addition to the pressure measurement value obtained by the above-described fuel pressure sensor 20a. As a result, the fuel pressure can be sensed with high accuracy.

The kind and the system configuration of the engine as the control target can also be arbitrarily modified in accordance with the use and the like.

In the above embodiment, the present invention is applied to the diesel engine as an example. However, fundamentally, the present invention can be also applied to a spark ignition gasoline engine (specifically, a direct-injection engine) and the like in the similar way. For example, a fuel injection system of a direct injection gasoline engine generally has a delivery pipe that stores fuel (gasoline) in a high-pressure state. In the system, the fuel is pumped from a fuel pump to the delivery pipe, and the high-pressure fuel in the delivery pipe is injected and supplied into an engine combustion chamber through an injector. The present invention can be applied also to such the system. In this system, the delivery pipe corresponds to the pressure accumulator.

The device and the system according to the present invention can be applied not only to the injector that injects the fuel directly into the cylinder but also to an injector that injects the fuel to an intake passage or an exhaust passage of the engine in order to control the fuel injection characteristic of the injector or the like. Moreover, the target injector is not limited to the injector illustrated in FIG. 2 but is arbitrary. When such the modification of the construction is applied to the above-described embodiment, it is desirable to appropriately modify the details of the various kinds of processing (programs) mentioned above into the optimum forms in accordance with actual construction (as design change) as needed.

In the above embodiment and the modifications, it is assumed that various kinds of software (programs) are used, Alternatively, similar functions may be realized by hardware such as dedicated circuits.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel injection characteristic sensing device used in a fuel injection system having a pressure accumulator that accumulates fuel to be supplied to a predetermined injector under pressure and at least one fuel pressure sensor for sensing pressure of the fuel flowing through an inside of a fuel passage extending from the pressure accumulator to a fuel injection hole of the injector at a predetermined point downstream of a neighborhood of a fuel discharge hole of the pressure accumulator with respect to a fuel flow direction, the fuel injection characteristic sensing device comprising:

a fuel pressure sensing means for sequentially sensing the fuel pressure at the predetermined point corresponding to the fuel pressure sensor based on at least one output of the at least one fuel pressure sensor;

an injection timing detecting means for detecting a predetermined timing in a series of operations concerning fuel injection of the injector based on the fuel pressure sequentially sensed by the fuel pressure sensing means;

a differentiating means for applying first or higher order differential processing to fuel pressure data sequentially sensed by the fuel pressure sensing means to obtain an inflection point of a pressure transition as a timing at which a differential value indicates a predetermined changing mode, wherein the injection timing detecting means detects all of an injection start timing, a maximum injection rate reaching timing at which an injection rate is maximized, a timing at which the injection rate starts decreasing after reaching the maximum injection rate and an injection end timing of the injector based on the pressure inflection point obtained by the differentiating means, and wherein the injection timing detecting means calculates a correction coefficient relating to each of the injection start timing, the maximum injection rate reaching timing, the timing at which the injection rate starts decreasing after reaching the maximum injection rate and the injection end timing based on the timings.

2. The fuel injection characteristic sensing device as in claim 1, wherein the differentiating means obtains the pressure inflection point in a predetermined period, whose start timing is set at an injection start command timing to the injector or at a timing based on the command timing, and the injection timing detecting means detects the injection start timing of the injector based on the pressure inflection point in the predetermined period obtained by the differentiating means.

3. The fuel injection characteristic sensing device as in claim 1, further comprising:

a first determining means for determining whether the pressure inflection point detected by the differentiating means is a target pressure inflection point based on the detection timing of the pressure inflection point or a position of the pressure inflection point in a chronological order of the pressure inflection points in a state where multiple pressure inflection points are detected by the differentiating means or every time the pressure inflection point is detected by the differentiating means.

4. The fuel injection characteristic sensing device as in claim 1, wherein at least one of the fuel pressure sensors is provided inside or near the injector.

5. The fuel injection characteristic sensing device as in claim 1, wherein at least one of the fuel pressure sensors is provided in a fuel discharge pipe of the pressure accumulator at a position closer to the fuel injection hole of the injector than the pressure accumulator.

6. The fuel injection characteristic sensing device as in claim 1, wherein the fuel pressure sensing means sequentially obtains a sensor output of the fuel pressure sensor at an interval short enough to plot a profile of a pressure transition waveform with the sensor output.

7. The fuel injection characteristic sensing device as in claim 1, wherein the fuel pressure sensing means sequentially obtains the sensor output of the fuel pressure sensor at an interval shorter than 50 microseconds.

8. The fuel injection characteristic sensing device as in claim 1, wherein the differentiating means applies filtering processing for cutting high frequency to the fuel pressure data sequentially sensed by the fuel pressure sensing means and then applies first or higher order differential processing to the data having undergone the filtering processing to derive the differential data.

9. The fuel injection characteristic sensing device as in claim 1, wherein
the injection timing detecting means is configured to be able to detect a plurality of timings in a series of operations concerning the fuel injection of the injector singularly or with another detecting means,
the fuel pressure sensing means sequentially senses the fuel pressure at respective times in a predetermined period, whose start timing is set to a timing when a predetermined one of the plurality of timings in a series of operations concerning the fuel injection of the injector is detected or a timing based on the detection timing of the predetermined one of the plurality of timings, and
the injection timing detecting means detects a predetermined timing in a series of operations concerning the fuel injection of the injector based on the fuel pressure in the predetermined period.

10. A fuel injection command correcting device comprising:
a correcting means for correcting the injection command to the injector using the predetermined timing concerning the fuel injection detected by the fuel injection characteristic sensing device as in claim 1.

11. The fuel injection command correcting device as in claim 10, wherein
the correcting means uses a timing of a predetermined event concerning the fuel injection detected by the fuel injection characteristic sensing device in a certain combustion cycle of a target engine to correct the injection command to the injector concerning a predetermined operation related to the fuel injection of the injector to be performed after the detected timing of the predetermined event in the same combustion cycle, thereby adjusting a timing of the predetermined operation related to the fuel injection.

12. The fuel injection command correcting device as in claim 11, wherein
the timing of the predetermined event concerning the fuel injection is a timing at which the injector starts the injection, and the predetermined operation related to the fuel injection is a valve closing operation of the injector.

13. A fuel injection characteristic sensing device used in a fuel injection system having a pressure accumulator that accumulates fuel to be supplied to a predetermined injector under pressure and at least one fuel pressure sensor for sensing pressure of the fuel flowing through an inside of a fuel passage extending from the pressure accumulator to a fuel injection hole of the injector at a predetermined point downstream of a neighborhood of a fuel discharge hole of the pressure accumulator with respect to a fuel flow direction, the fuel injection characteristic sensing device comprising:
a fuel pressure sensing means for sequentially sensing the fuel pressure at the predetermined point corresponding to the fuel pressure sensor based on at least one output of the at least one fuel pressure sensor;
an injection timing detecting means for detecting a predetermined timing in a series of operations concerning fuel injection of the injector based on the fuel pressure sequentially sensed by the fuel pressure sensing means; and
a differentiating means for applying first or higher order differential processing to fuel pressure data sequentially sensed by the fuel pressure sensing means to obtain differential data including at least one of a differential value at a predetermined timing, a timing indicating a predetermined differential value and a timing at which differential value indicates a predetermined changing mode; wherein:
the injection timing detecting means detects a predetermined timing in a series of operations concerning the fuel injection of the injector based on the differential data obtained by the differentiating means;
the differentiating means obtains a cross point as a tinting at which an n-th order differential value of the fuel pressure shifts from a smaller side to a larger side than a predetermined threshold value or shifts from the larger side to the smaller side than the predetermined threshold value based on the n-th order differential value of the fuel pressure in a predetermined period, n being an integer equal to or greater than one;
injections timing detecting means detects a predetermined timing in a series of operations concerning the fuel injection of the injector based on the cross point obtained by the differentiating means; and
the injector has a fluid control valve that controls an inflow of a fluid to a predetermined space and an outflow of the fluid from the same space and a needle that performs a reciprocation operation inside a valve body of the injector in accordance with a pressure change of the space accompanying the inflow and the outflow of the fluid to open and close an injection hole or a fuel supply passage extending to the injection hole, thereby performing valve opening and valve closing of the injector,
the differentiating means obtains the cross point as a timing at which a first order differential value of the fuel pressure shifts from a smaller side to a larger side than a predetermined threshold value based on the first order differential value of the fuel pressure in a predetermined period, and
the injection timing detecting means detects a closing timing of the fluid control valve based on the cross point obtained by the differentiating means.

14. A fuel injection characteristic sensing device used in a fuel injection system having a pressure accumulator that accumulates fuel to be supplied to a predetermined injector under pressure and at least one fuel pressure sensor for sensing pressure of the fuel flowing through an inside of a fuel passage extending from the pressure accumulator to a fuel injection hole of the injector at a predetermined point downstream of a neighborhood of a fuel discharge hole of the pressure accumulator with respect to a fuel flow direction, the fuel injection characteristic sensing device comprising:
a fuel pressure sensing means for sequentially sensing the fuel pressure at the redetermined point corresponding fuel pressure sensor based on at least one output of the at least one fuel pressure sensor;
an injection timing detecting means for detecting a predetermined timing in a series of operations concerning fuel injection of the injector based on the fuel pressure sequentially sensed by the fuel pressure sensing means: and
a differentiating means for applying first or higher order differential processing to fuel pressure data sequentially sensed by the fuel pressure sensing means to obtain differential data including at least one of a differential value at a predetermined timing, a timing indicating a predetermined differential value and a timing at which a differential value indicates a predetermined changing mode: wherein;
the injection timing detecting means detects a predetermined timing in a series of operations concerning the fuel injection of the injector based on the differential data obtained by the differentiating means;

the differentiating means obtains a cross point as a timing at which an n-th order differential value of the fuel pressure shifts from a smaller side to a larger side than a predetermined threshold value or shifts from the larger side to the smaller side than the predetermined threshold value based on the n-th order differential value of the fuel pressure in a predetermined period, n being an integer equal to or greater than one; and the injection timing detecting means detects a predetermined timing in a series of operations concerning the fuel injection of the injector based on the cross point obtained by the differentiating means;

the differentiating means obtains the cross point as a timing at which a second order differential value of the fuel pressure shifts from a larger side to a smaller side than a predetermined threshold value based on the second order differential value of the fuel pressure in a predetermined period, and the injection timing detecting means detects an injection start timing of the injector based on the cross point obtained by the differentiating means.

15. The fuel injection characteristic sensing device as in claim 14, further comprising:

a first setting means for variably setting the threshold value concerning the cross point in accordance with fuel pressure immediately before the injection or an equivalent value of the fuel pressure immediately before the injection.

16. The fuel injection characteristic sensing device as in claim 14, further comprising:

a second setting means for variably setting the threshold value concerning the cross point in accordance with an injection start command timing directed by an injection start command to the injector.

17. The fuel injection characteristic sensing device as in claim 14, further comprising:

a third setting means for variably setting the threshold value concerning the cross point in accordance with pressure in a cylinder of a target engine.

18. A fuel injection characteristic sensing device used in a fuel injection system having a pressure accumulator that accumulates fuel to be supplied to a predetermined injector under pressure and at least one fuel pressure sensor for sensing pressure of the fuel flowing through an inside of a fuel passage extending from the pressure accumulator to a fuel injection hole of the injector at a predetermined point downstream of a neighborhood of a fuel discharge hole of the pressure accumulator with respect to a fuel flow direction, the fuel injection characteristic sing device comprising:

a fuel pressure sensing means for sequentially sensing the fuel pressure at the predetermined point corresponding to the fuel pressure sensor based on at least one output of the at least one fuel pressure sensor;

an injection timing detecting means for detecting a predetermined timing in a series of operations concerning fuel injection of the injector based on the fuel pressure sequentially sensed by the fuel pressure sensing means; and a differentiating means for applying first or higher order differential processing to fuel pressure data sequentially sensed by the fuel pressure sensing means to obtain differential data including at least one of a differential value at a predetermined timing, a timing indicating a predetermined differential value and a timing at which a differential value indicates a predetermined changing mode; wherein:

the injection timing detecting means detects a predetermined timing in a series of operations concerning the fuel injection of the injector based on the differential data obtained by the differentiating means;

the differentiating means obtains a cross point as a timing at which an n-th order differential value of the fuel pressure shifts from a smaller side to a larger side than a predetermined threshold value or shifts from the larger side to the smaller side than the predetermined threshold value based on the n-th order differential value of the fuel pressure in a predetermined period, n being an integer equal to or greater than one;

the injection timing detecting means detects a predetermined timing in a series of operations concerning the fuel injection of the injector based on the cross point obtained by the differentiating means;

a second determining means for determining whether the cross point detected by the differentiating means is a target cross point based on detection timing of the cross point or a position of the cross point in a chronological order of the cross points in a state where multiple cross points are detected by the differentiating means or every time the cross point is detected by the differentiating means.

19. A fuel injection characteristic sensing device used in a fuel injection system having a pressure accumulator that accumulates fuel to be supplied to a predetermined injector under pressure and at least one fuel pressure sensor for sensing pressure of the fuel flowing through an inside of a fuel passage extending from the pressure accumulator to a fuel injection hole of the injector at a predetermined point downstream of a neighborhood of a fuel discharge hole of the pressure accumulator with respect to a fuel flow direction, the fuel injection characteristic sensing device comprising:

a fuel pressure sensing means sequentially sensing the fuel pressure at the predetermined point corresponding to the fuel pressure sensor based on at least one output of the at least one fuel pressure sensor;

an injection timing detecting means detecting a predetermined timing in a series of operations concerning fuel injection of the injector based on the fuel pressure sequentially sensed by the fuel pressure sensing means; and a differentiating means for applying first or higher order differential processing to fuel pressure data sequentially sensed by the fuel pressure sensing means to obtain differential data including at least one of a differential value at a predetermined timing, a timing indicating a predetermined differential value and a timing at which a differential value indicates a predetermined changing mode; wherein:

the injection timing detecting means detects a predetermined timing in a series of operations concerning the fuel injection of the injector based on the differential data obtained by the differentiating means; and the differentiating means detects a start point of steep pressure increase or steep pressure decrease, in which a pressure change amount per unit time exceeds a predetermined level, as the timing at which the differential value indicates the predetermined changing mode.

20. The fuel injection characteristic sensing device as in claim 19, wherein the injection timing detecting means detects either one of an injection start timing of the injector and a timing at which an injection rate starts decreasing after reaching the maximum injection rate based on the start point of the pressure increase or the pressure decrease obtained by the differentiating means.

21. The fuel injection characteristic sensing device as in claim 19, wherein the injector has a fluid control valve for controlling an inflow of a fluid to a predetermined space and an outflow of the fluid from the space and a needle that performs reciprocation operation inside a valve body of the injector in accordance a change in pressure in the space accompanying the inflow and the outflow of the fluid to open and close an injection hole or a fuel supply passage extending to the injection hole, thereby performing valve opening and valve closing of the injector, and the injection timing detecting means detects either one of valve opening timing and valve closing timing of the fluid control valve.

* * * * *